United States Patent
Ueno et al.

(10) Patent No.: US 7,707,306 B2
(45) Date of Patent: Apr. 27, 2010

(54) ROUTING DEVICE FOR CONNECTING MULTIPLE PHYSICALLY DISCRETE NETWORKS INTO A SINGLE SYSTEM AND STARTUP METHOD THEREOF

(75) Inventors: Reiko Ueno, Takarazuka (JP); Yasuyuki Shintani, Nishinomiya (JP); Chihiro Kawahara, Kadoma (JP); Seizo Tsuji, Katano (JP)

(73) Assignee: Panasonic Corporation, Osaka (JP)

( * ) Notice: Subject to any disclaimer, the term of this patent is extended or adjusted under 35 U.S.C. 154(b) by 792 days.

(21) Appl. No.: 10/501,234

(22) PCT Filed: Jan. 15, 2003

(86) PCT No.: PCT/JP03/00242

§ 371 (c)(1),
(2), (4) Date: Jul. 12, 2004

(87) PCT Pub. No.: WO03/067813

PCT Pub. Date: Aug. 14, 2003

(65) Prior Publication Data
US 2005/0102384 A1 May 12, 2005

(30) Foreign Application Priority Data

| Jan. 15, 2002 | (JP) | 2002-006497 |
| Feb. 5, 2002 | (JP) | 2002-028342 |
| Feb. 21, 2002 | (JP) | 2002-044765 |
| Sep. 18, 2002 | (JP) | 2002-270846 |

(51) Int. Cl.
G06F 15/173 (2006.01)
(52) U.S. Cl. .................. 709/238; 709/239; 709/240; 709/241; 709/242; 709/243
(58) Field of Classification Search .................. 709/238, 709/224, 230
See application file for complete search history.

(56) References Cited

U.S. PATENT DOCUMENTS 5,150,464 A * 9/1992 Sidhu et al. .................. 709/222
5,572,528 A * 11/1996 Shuen ......................... 370/402

(Continued)

FOREIGN PATENT DOCUMENTS

| EP | 1 039 725 | 9/2000 |
| EP | 1039725 A2 * | 9/2000 |
| EP | 1 115 263 | 7/2001 |

OTHER PUBLICATIONS

S. Garrett, "System and Application Management in a Home Network", Proceedings of the International Conference on Consumer Electronics (ICCE), Rosemont, Jun. 5-7, 1991, New York, IEEE, US, vol. Conf. 10, Jun. 5, 1991, pp. 86-87.

Primary Examiner—Jeffrey Pwu
Assistant Examiner—Abdelnabi O Musa
(74) Attorney, Agent, or Firm—Wenderoth, Lind & Ponack, L.L.P.

(57) ABSTRACT

One routing device which connects plural networks on which a plurality of other routing devices, including a parent router, are connected. The parent router manages network identification data to identify the plural networks. Master router data is included for each corresponding other routing device. Master router data includes master router identification data identifying whether the corresponding other routing device is a "master router" located on a path to the parent router or a "slave router" which is a routing device other than the master router, and includes network identification data identifying a network to which the corresponding other routing device connects. Upon startup of the one routing device, the master router data is acquired from the other routing devices on the networks to which the one routing device connects. It is determined whether a router function of the one routing device is enabled based on the acquired master router data.

17 Claims, 19 Drawing Sheets

U.S. PATENT DOCUMENTS

| | | | |
|---|---|---|---|
| 5,602,754 A * | 2/1997 | Beatty et al. | 716/6 |
| 5,751,971 A * | 5/1998 | Dobbins et al. | 709/238 |
| 6,049,524 A * | 4/2000 | Fukushima et al. | 370/220 |
| 6,052,736 A * | 4/2000 | Ogle et al. | 709/244 |
| 6,112,248 A * | 8/2000 | Maciel et al. | 709/238 |
| 6,658,481 B1 * | 12/2003 | Basso et al. | 709/243 |
| 6,751,191 B1 * | 6/2004 | Kanekar et al. | 370/217 |
| 6,950,427 B1 * | 9/2005 | Zinin | 370/386 |
| 7,126,944 B2 * | 10/2006 | Rangarajan et al. | 370/389 |

* cited by examiner

Fig. 4

| ROUTER ATTRIBUTE | ROUTER IDENTIFIER | NUMBER OF CONNECTED SUBNETS | NET ID OF SUBNET A | NODE ID OF SUBNET A | NET ID OF SUBNET B | NODE ID OF SUBNET B |
|---|---|---|---|---|---|---|
| | 41 | 42 | 43 | 44 | 45 | 46 |

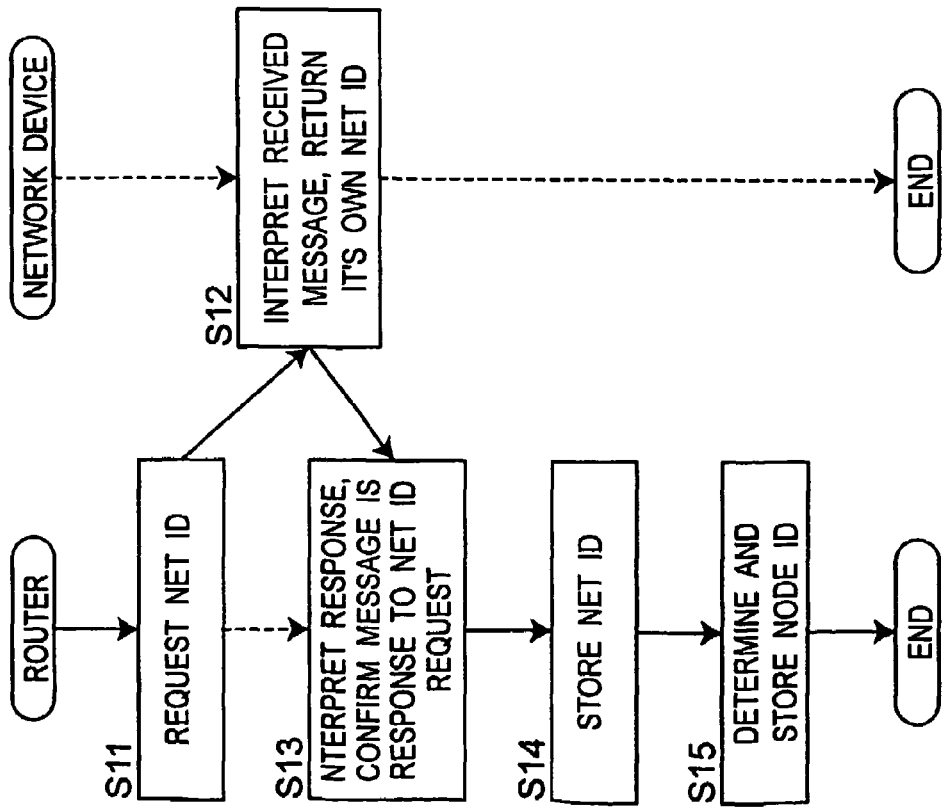
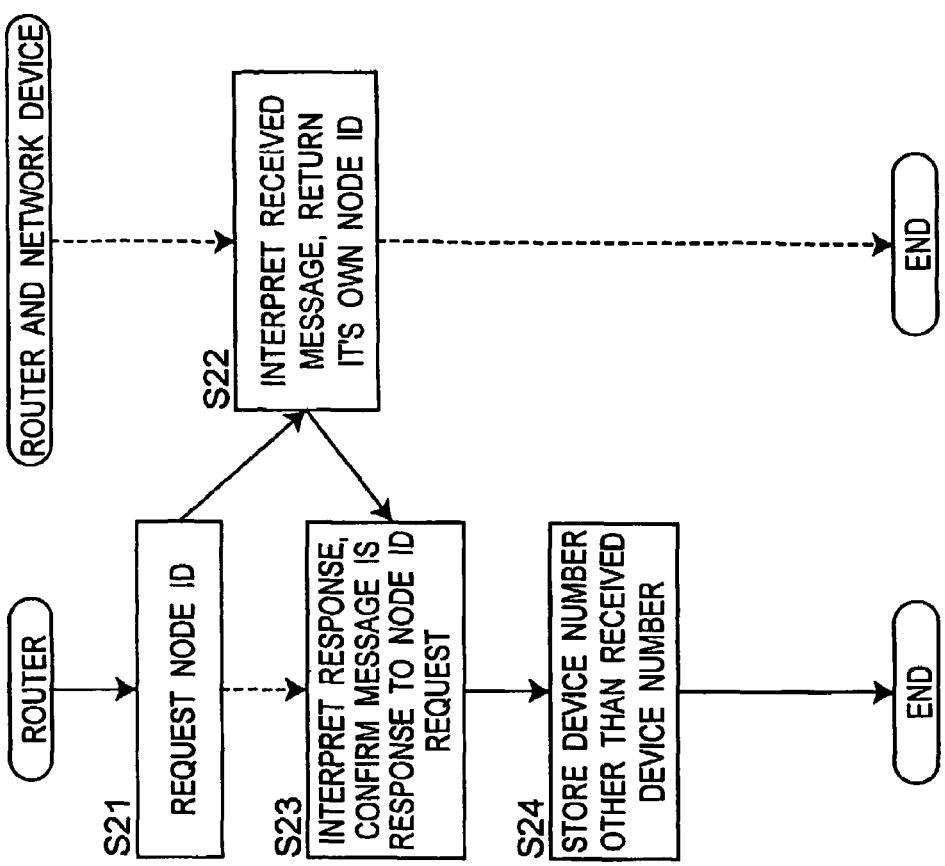
Fig. 11A
Fig. 11B

Fig.13

| 41 | 42 | 43 | 44 | 45 | 46 | 47 | 48 |
|---|---|---|---|---|---|---|---|
| ROUTER IDENTIFIER | NUMBER OF CONNECTED SUBNETS | NET ID OF SUBNET A | NODE ID OF SUBNET A | NET ID OF SUBNET B | NODE ID OF SUBNET B | MASTER ROUTER DATA FOR SUBNET A | MASTER ROUTER DATA FOR SUBNET B |

ROUTING DEVICE FOR CONNECTING MULTIPLE PHYSICALLY DISCRETE NETWORKS INTO A SINGLE SYSTEM AND STARTUP METHOD THEREOF

BACKGROUND OF THE INVENTION

1. Field of the Invention

The present invention relates generally to a routing device for connecting multiple physically discrete networks into a single system.

2. Description of the Related Art

Recently various home networks connecting multiple electronic devices over a network have been introduced. The devices connected to these home networks are generally low-cost home appliances for which high reliability operation is required. The devices connected to such home networks enable the network to be used for a variety of applications, including security systems and remote control systems.

FIG. 1 is a schematic diagram of a typical home network. As shown in FIG. 1 a refrigerator 1, a washing machine 2, an air conditioner 3, a television 4, a controller 11, and so on are connected to a powerline communication network 15. A microwave 5, a bath (hot water heater) 6, a gas range 7, and so on are connected to a wireless communication network 16. A sleep sensor 8, an entry sensor 9, a telephone 10 and so on are connected to a dedicated line 14. The powerline communication network 15 and the dedicated line 14 are connected to a router 12, and the powerline communication network 15 and the wireless communication network 16 are connected to a router 13. These network connections complete the in-home network.

Other devices that might also be connected to this network include lighting fixtures and other home appliances. Infrared and other transmission media could also be used in addition to or instead of electrical power lines, wireless transmission, and dedicated lines. Multiple controllers for specific services could also be used instead of using a single controller as shown in FIG. 1.

FIG. 2 is a system diagram showing the conceptual arrangement of devices and routers connected to this home network. As shown in FIG. 2 a subnet A 21 is connected to a subnet B 22 through a router 31 and to a subnet C 23 through a router 32. Network devices 21a to 23d are connected to subnets 21 to 23. The routers 31 and 32 could be any device that functions as a router. Various standards and concepts have been proposed for effectively running and using such networks. These include, for example, ET-2010 and ECHONET Specification Ver.1.00, proposed by the Electronic Industries Association of Japan (EIAJ) and the ECHONET Consortium.

Assume, for example, that the router 31 shown in FIG. 2 is operating and network device 21a functions as a router ("parent router" below) that assigns "Net ID" as a subnet identifier. If a new router 32 is then added to the system, the router 32 must first start up as a network device 21c and 23d recognizable by subnet 21 and subnet 23, respectively, and must then query subnet 21 and subnet 23 to determine if a router already exists on the respective subnets. If a router is found on each subnet, the router 32 starts up as a network device of both subnets without activating its functionality as a router.

If on at least one (21) of the plural subnets (21 and 23) there is a router (31) and on at least one (23) of the subnets there is no router, the router 32 queries the detected router to acquire data about the parent router (i.e. network device 21a in this example). The router 32 then requests the parent router (network device 21a) for the information required for the router 32 to function (i.e., a router identifier and Net ID for the new subnet added to the system), and based on this router information obtained from the parent router (network device 21a) passes the Net ID to all network devices 23a to 23c on the subnet 23 to which a new Net ID was allocated.

The Net IDs uniquely allocated as subnet identifiers and the node ID numbers allocated as identifiers uniquely identifying each device on a particular subnet enable each device to be uniquely addressed within the overall system formed by linking plural subnets via routers.

Conventional network methods and routers function adequately when the routers start up in the same order previously used. Problems such as those described below occur, however, if Net IDs are already assigned to the subnets by the router (that is, the same Net ID is allocated to all network devices connected to a particular subnet), since all network devices on the subnet use the assigned Net ID to exchange data with other devices in the domain, if, for example, the power supply suddenly shuts down due to a power outage, then a system-wide reset occurs.

If the subnet identifiers (i.e., Net IDs) are assigned in the sequence that the routers start up in a system having three or more subnets, a subnet identifier (Net ID), that is different from the subnet identifier assigned before the reset, could be assigned when the system resets depending upon the startup sequence of the routers. If in the network configuration shown in FIG. 2, for example, the router 31 starts up first and is therefore assigned a Net ID identifying subnet B, the router 32 then starts up and is assigned a Net ID identifying subnet C, when due to a power failure the system restarts and the router 32 starts up first and the router 31 then restarts, the router 32 will be set as subnet B and router 31 will be set as subnet C. In other words, Net IDs assigned to the routers may change when the system resets due to the power outage.

Furthermore, if only one of the routers in the system resets or is replaced and there is another router on any of the subnets to which the reset or replaced router belongs, the reset or replaced router will start up simply as a network device other than the router on the subnets and its router function will not restart.

This can result in excessive time being required for the overall system to restart when a short-term power outage occurs on a home network, and the controllers and user could be confused by device identifiers that differ before and after the power outage, thus necessitating a service call by a trained technician.

Replacing a router is also not a simple task. The user (i.e., a typical homeowner) must acquire the subnet data for the subnet(s) formed by the router connection before replacing the router by, for example, connecting a display to the router to display the information, and must then reset the same information to the replacement router by setting switches, for example. The need for a person to intervene to make these settings introduces the potential for setup errors which can then prevent the system from functioning normally.

A problem with the router and router startup procedure according to the prior art as described above is that when there is another router on any of the subnets to which a router that is replaced or reset belongs and a Net ID is already assigned to those subnets, the replaced or reset router does not function as a router but simply as another network device. Communication with the subnets that should be connected by the replaced or reset router is thus not possible.

A further problem with the router and router startup procedure according to the prior art as described above is that while a router that is replaced or reset (referred to below as the "target router") will function as a router when there is another router on one or more of the subnets to which the target router connects but there is not a router on a different one or more such subnets, the parent router allocates a new Net ID to the subnet that does not have a router. The Net ID may thus be different before and after the router is replaced or reset, and the parent router, subnet router, and network devices use a different Net ID to uniquely identify each network device on the subnet within the network system. As a result, network devices on another subnet that had been communicating with network devices on the subnet for which the router was replaced or reset before the router was replaced or reset are unable to recognize that the network device identification information (Net ID) changed, and an error results when communication is next attempted because the addressed network device cannot be found on the network.

A further problem with the router and router startup procedure according to the prior art as described above occurs. That is, if communication with the parent router is not possible because there is another router on one or more subnets to which the target router that is replaced or reset connects and there is not a router on another one or more subnets, or because, even though there is a router operable to start up as a router, the parent router is separated via several subnets from the target router but there is a malfunctioning router somewhere between the target router and the parent router, then the target router cannot activate its router function and can only startup as another non-router network device. Communication between network devices on subnets previously connected by the target router is also disabled until the entire system resets.

SUMMARY OF THE INVENTION

The present invention is directed to solve these problems, and an object of the invention is to provide a routing device and startup method for the same whereby a previous setup can be automatically maintained without disrupting operation of a part or all of the system when the entire system resets or a specific router is replaced or is independently reset.

According to the invention, a router which is newly connected to a subnet or is re-started acquires identification data to uniquely identify the router on the network from the other routers or network devices other than routers on the subnet to which the router connects. This allows the router to start up with previous subnet identification data upon a replacement or restart of the router.

A method according to the present invention is a startup method of a routing device connecting plural networks on which the other routing devices are connected. A parent router which manages network identification data to identify the plural networks is connected to one of the plural networks. The other routing devices connected to the plural networks have master router data. The master router data includes master router identification data identifying whether the other routing device is a master router which is located on a path to the parent router or a slave router which is a routing device other than the master router, and includes network identification data identifying a network to which the other routing devices are connected. On startup, the master router data is acquired from the other routing devices on the networks to which the routing device connects. Then it is determined whether a router function of the routing device is enabled based on the acquired master router data.

The router function may be disabled when all master router identification data in the acquired master router data indicate the slave router.

The router function may be disabled when acquiring two or more master router data having master router identification data indicating the master router.

The routing device may be started up with the router function enabled when acquiring one master router data having the master router identification data indicating the master router.

When a communication device connected to the networks has an identification data to identify a network to which the device connects, the identification data may be acquired from the communication device connected to the network to which the other routing device with the master router identification data indicating the slave router connects. The routing device may be started up when there is at least one network to which the network identification data is not provided. In this case, data relating to the parent router may be acquired from the other routing device having the master router identification data which indicates the master router, and the routing device may request the parent router for a registration.

BRIEF DESCRIPTION OF THE DRAWINGS

FIG. 4 shows a data structure of router data of a router according to the present invention;

FIGS. 11A and 11B are flow charts showing the setup procedure when a router according to the present invention starts up;

FIG. 13 shows an alternative configuration of router data of a router according to the present invention;

DETAILED DESCRIPTION OF THE INVENTION

Preferred embodiments of a routing device according to the present invention are described below with reference to the accompanying figures. A routing device (simply "router" below) as described below is a communication device with a function for interconnecting subnets in a home network connecting multiple electrical devices together in a network as shown by way of example in FIG. 1.

DEFINITION OF TERMS

Specific terms used below are defined and used as follows.

"Target router": A router for which a new subnet identification information is to be set as a result of connection to a new network or a process for recovering from a power outage, for example.

"Parent router": A router with a function for assigning Net IDs as subnet identifiers.

"General router": Any router other than the parent router.

"Master router": When there are plural routers on a subnet, a router which is on a path to the parent router (that is, the first router on the subnet to which a router address is assigned by the parent router).

"Slave router": A router other than the master router within a subnet.

"Node": A communication function on the network uniquely identified by a network address. This term is used for referring to a function as a communication terminal on the network.

First Embodiment

Figure 3:
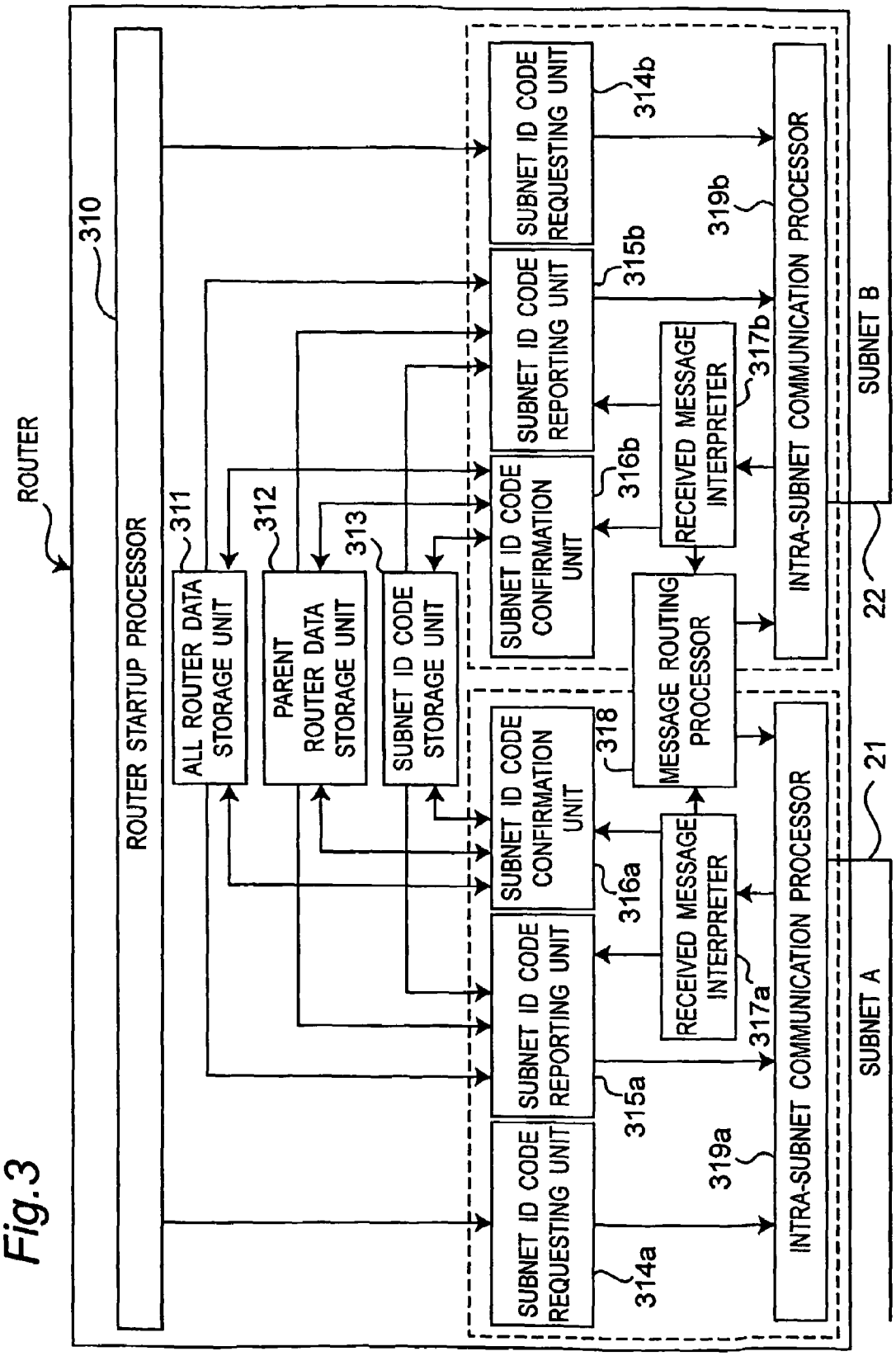
FIG. 3 is a block diagram showing a configuration of a router according to the present invention.

FIG. 3 is a block diagram showing a configuration of a router according to the present invention. The router startup processor 310 runs a process for booting the router when the power supply turns on or the router is replaced, for example. The all router data storage unit 311 stores all information for routers in the whole system. The parent router data storage unit 312 stores information for the parent router which assigns subnet Net IDs to the routers. The subnet ID code storage unit 313 stores the plural subnet ID codes of a router according to the present invention.

Subnet ID code requesting units 314a and 314b are activated by the router startup processor 310 and run a process for requesting the Net ID from other routers and network devices on each subnet. Subnet ID code reporting units 315a and 315b report the Net ID of the router 31 when the Net ID is requested by another router. Subnet ID code confirmation unit 316a and 316b confirm a response to the request by the subnet ID code requesting units 314a and 314b.

Received message interpreters 317a and 317b interpret received messages and handle passing the messages to specific devices. Message routing processor 318 handles passing messages between devices on different subnets (subnet A and subnet B in this example). Intra-subnet communication processors 319a and 319b process closed communications between devices on a single subnet.

It should be noted that a router (such as router 31, router 32, router R1, . . . ) of the present invention that runs the startup sequence described below is configured as shown in FIG. 3.

FIG. 4 shows one example of a structure of a self data (router data) held by a router according to the present invention. The router data may include a router attribute such as data indicating whether it is possible to provide a Net ID, or whether the router function is provided. Router identifier 41 is provided by the parent router and is a value enabling the router to be uniquely identified on the network system. Number of connected subnets 42 denotes the number of subnets connected to the router. Net ID 43 is the Net ID of one subnet (subnet A in this example) connected to the router. Node ID 44 denotes the node ID of a router in one subnet (subnet A) connected to the router. Net ID 45 is the Net ID of another subnet (subnet B in this example) connected to the router. Node ID 46 denotes the node ID of a router in the other subnet (subnet B) connected to the router. The number of held combinations of Net ID and Node ID equals to the number of subnets connected.

Figure 5:
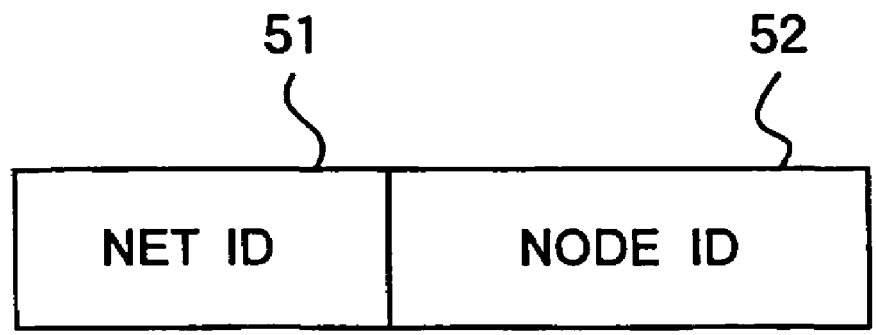
FIG. 5 shows a data structure of parent router data of a router according to the present invention.

FIG. 5 shows exemplary a structure of the parent router data stored by a router according to the present invention. The parent router identifier contains the parent router Net ID 51 and Node ID 52 on the subnet to which the parent router connects. This parent router data is stored in the parent router data storage unit 312.

The parent router and general routers include all router data which is obtained by collecting the subnet ID codes as shown in FIG. 4 from all routers on a network. The all router data is stored in the all router data storage unit 311. Router data relating to the subnets connected to a particular router is stored in the subnet ID code storage unit 313 of that router. An example configuration of all router data is shown below.

1 byte: number of all routers 2 byte or after: There are the following sets of the router data for each router.

all router data 1 byte: Router ID
   2 byte: number (n) of connected subnets
   3 to (2×n+2) byte: Network address data held (for n)

Message

Figure 6A:
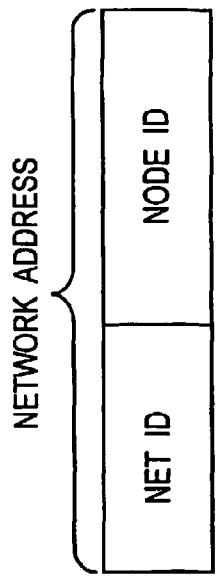
FIG. 6A shows a network address uniquely identifying a router according to the present invention.
Figure 6B:
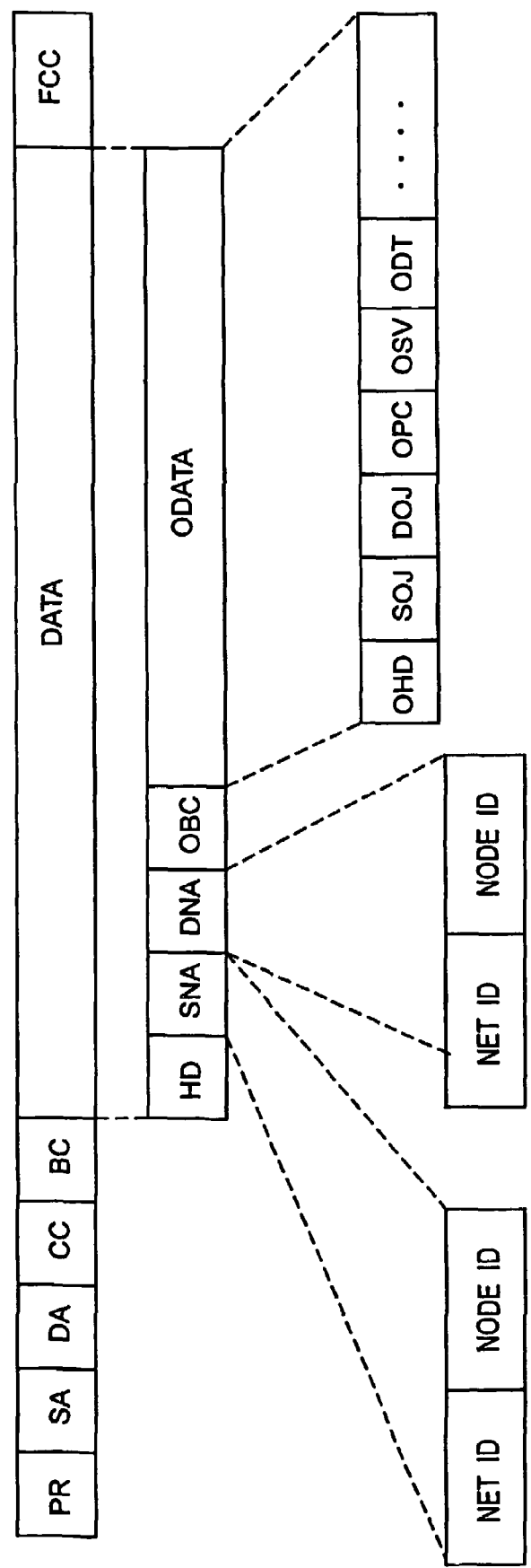
FIG. 6B shows a typical configuration of a message used for communication by a router according to the present invention.

FIGS. 6A and 6B show an example of a communication message protocol. An address of the parent router, the general router, or the network device on multiple subnets according to the present invention is uniquely defined by a combination of the Net ID and Node ID as shown in FIG. 6A.

FIG. 6B shows an exemplary configuration of the message protocol. PR is a priority code, SA is a source address, DA is a destination address, CC is a control code, BC is a message length code, DATA is a message storage area associated with a network according to the present invention, and FCC is a message check code. PR, SA, DA, CC, BC, DATA, and FCC are based on a message configuration determined by each subnet and used in a network format defined within each closed subnet. The source address (SA) and destination address (DA) are thus addresses set within each subnet.

A message relating to a network of the present invention is stored in the DATA area. The DATA area stores a header (HD), source network address (SNA), destination network address (DNA), and object message (ODATA).

The object message (ODATA) area contains an object message header (OHD), source object specifier (SOJ), destination object specifier (DOJ), object property code (OPC), object service code (OSV), and object data value (ODT).

In this invention, SNA stores the network address containing the Net ID and Node ID of the source device, DNA stores the network address containing the Net ID and Node ID of the destination device, respectively. Codes specifying a request for Net ID transmission and a response thereto is stored to the object service code (OSV). The value of the Net ID in the response is stored to the object data area (ODT).

Figure 1:
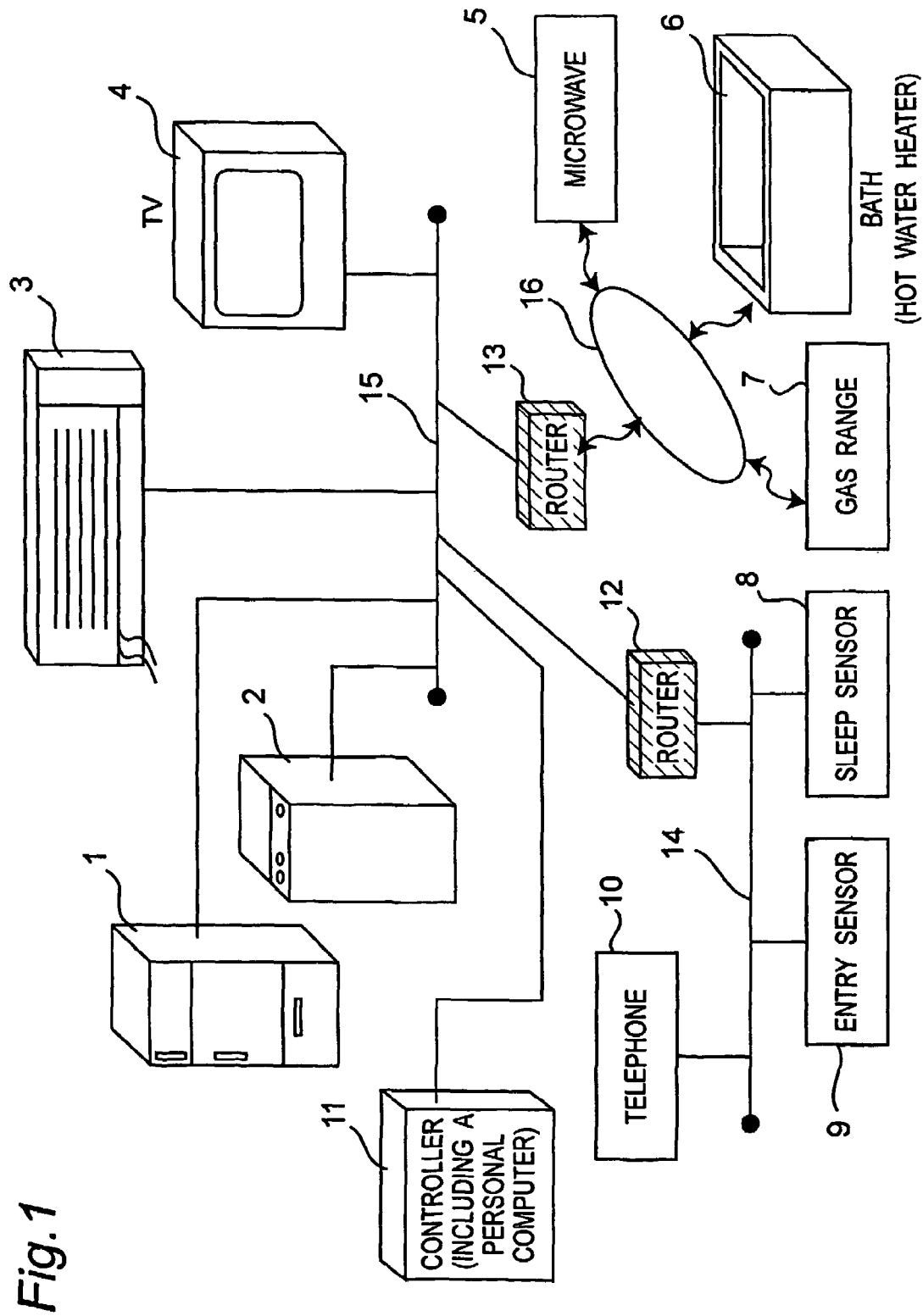
FIG. 1 is a schematic drawing of a home network on which the present invention is deployed.
Figure 2:
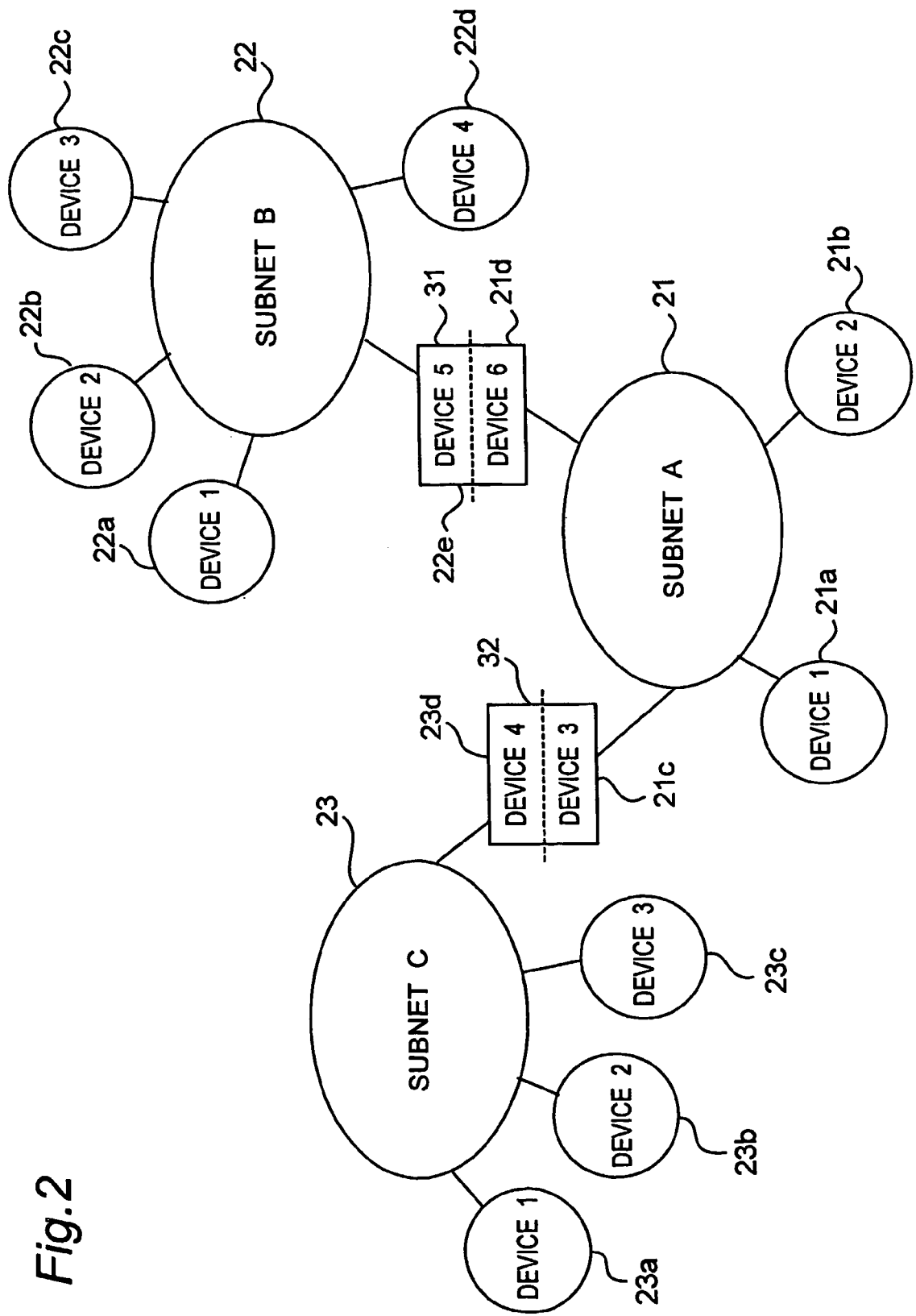
FIG. 2 shows a configuration of a home network on which the present invention is deployed.

An example of the router 31 operation in a network as shown in FIG. 1 and FIG. 2 when the power is turned on for the first time or the router resets is described next. The router 31 in this embodiment is connected to both subnet A (21) and subnet B (22).

Referring to FIG. 2 and FIG. 3, when router power turns on the first time or the router is reset, the router startup processor 310 of the router 31 activates the subnet ID code requesting unit 314a to run a process for acquiring Net ID from another router 32 or network device 21a or 21b on the same subnet A (21) as the router 31. The subnet ID code requesting unit 314a assembles a message requesting Net ID from all routers connected to the subnet A (21), and broadcasts the message through intra-subnet communication processor 319a to the subnet A (21). The content of this broadcast message requests the Net ID stored by each router, for example.

A router 32 receiving this request interprets the received message by way of its intra-subnet communication processor, and then returns the Net ID. The subnet ID code reporting unit in the router 32 then reads and returns the Net ID for subnet A from the subnet ID code storage unit.

When the router 31 receives the Net ID for subnet A, the intra-subnet communication processor 319a passes the received data through the received message interpreter 317a to subnet ID code confirmation unit 316a. The subnet ID code confirmation unit 316a sets the Net ID for the subnet in the message received from the other router to the Net ID for subnet A of the router 31 itself, and update, with this value, the value for Net ID 43 for subnet A stored in the subnet ID code storage unit 313.

Thus, if there is no change in the physical configuration of the network before and after a router is replaced or reset, the replaced or reset router can start up using the Net ID used before the router was replaced or reset. Therefore, reallocating the Net ID to each device every time when the router is replaced or reset can therefore be avoided. In the above description the request is done to the router prior to the devices other than the router, and thus unnecessary communication and burdens of the devices other than the router can be reduced when a router exists on the subnet.

It will be apparent that if there is no router on the subnet in this example a response to the Net ID request will not be returned and the Net ID of subnet A cannot be obtained. This creates the possibility that when the router 31 is replaced with a different router or the router 31 with all stored data is reset for some reason the router 31 will not even be able to communicate. In this case the subnet ID code confirmation units 316a, 316b can announce the router startup processor 310 to acquire the Net ID from a network device other than a router. This announce can be applied directly to the subnet ID code requesting units 314a, 314b.

An operation to obtain Net ID from a network device is described next.

In order to establish a communication over subnet A, the router startup processor 310 or the subnet ID code confirmation unit 316a first sets its own temporary Node ID as may be needed. Because this is a provisional value, the Node ID is preferably set to a value such as the maximum or minimum value possible on the subnet, that is most unlikely to be used by another device. Communication within the subnet A is possible once this temporary device number is set.

A message is then broadcast over subnet A to acquire the Net ID stored by another device on subnet A. The Net ID of the device (such as refrigerator 1, washing machine 2, or air conditioner 3) is then extracted by the intra-subnet communication processor 319a, the received message interpreter 317a, and the subnet ID code confirmation unit 316a in the transmitted sequence. The Net ID of the subnet A to which a normally functioning router 31 was connected, can be confirmed.

Since there is a possibility that devices other than routers can be reset, the following priority process is done in the determination of the Net ID.

If the plural Net IDs obtained as described above include a Net ID for a parent router (controller 11) or general router, the Net ID from the parent router is preferentially recognized as the Net ID of the subnet A connected to the router 31.

If the plural Net IDs include a Net ID for a parent router or general router and there are duplicated Net IDs, the most frequently duplicated (i.e., most numerous) Net ID is recognized as the Net ID for subnet A. For example, if the Net ID of "01" is detected twice and the Net ID of "03" is detected once, "01" is taken as the Net ID.

If the plural Net IDs do not include a Net ID for a parent router or general router, the most frequent Net ID from the general devices is recognized as the Net ID for subnet A. The recognized Net ID is then stored in the Net ID memory area reserved for subnet A in subnet ID code information storage unit 313. Thus, the most numerous devices can be communicated.

By the above method, the communication in subnet A has been completely activated but the router identifier (Net ID) or Node ID of the router are still temporary settings. Therefore, in order to completely restore subnet A to the previous settings, if there is a parent router or other router present, then the all router data is obtained from the parent router or other router, and the Node ID and router identifier of the router 31 are reset using the previously acquired and interpreted Net ID. The case that the parent router is present is a special case. A case in which the parent router is not on the subnet is described below for a general subnet.

Based on the result of interpreting the previously acquired Node ID for each device on subnet A, the Node ID that is not in the Node ID sequence is found. If Node IDs are 02, 03 and 04, for example, then a second temporary setting is done in which 01 is taken as a provisional Node ID for the router. Otherwise, if Node IDs are 01, 02 and 04 are already used, then a second temporary setting is done in which 03 is taken as a provisional Node ID for the router. Then the Net ID of the subnet is acquired in the above described way. The acquired Net ID is then stored in the subnet A memory area in the subnet ID code storage unit 313.

The same operation is run on subnet B to set the Net ID and Node ID. The router 31 is thus able to communicate with other devices on both subnets A and B, is therefore able to route communication over subnets A and B. This allows subnets A and B to be connected functionally.

It should be noted that subnets A and B can be the same or different types of networks. Communication within subnet A or subnet B is on a layer below the communication layer related to the present invention, and is closed within each subnet, having separate communication protocols and a addressing system. It will be obvious that in the above description the communication on this lower layer has been established and intra-subnet communication processors 319a, 319b handle the communication on this lower layer.

A communication method for achieving a request process and recovery process of Net ID and Node ID for the router and network devices as described above is described in detail below.

Figure 10:
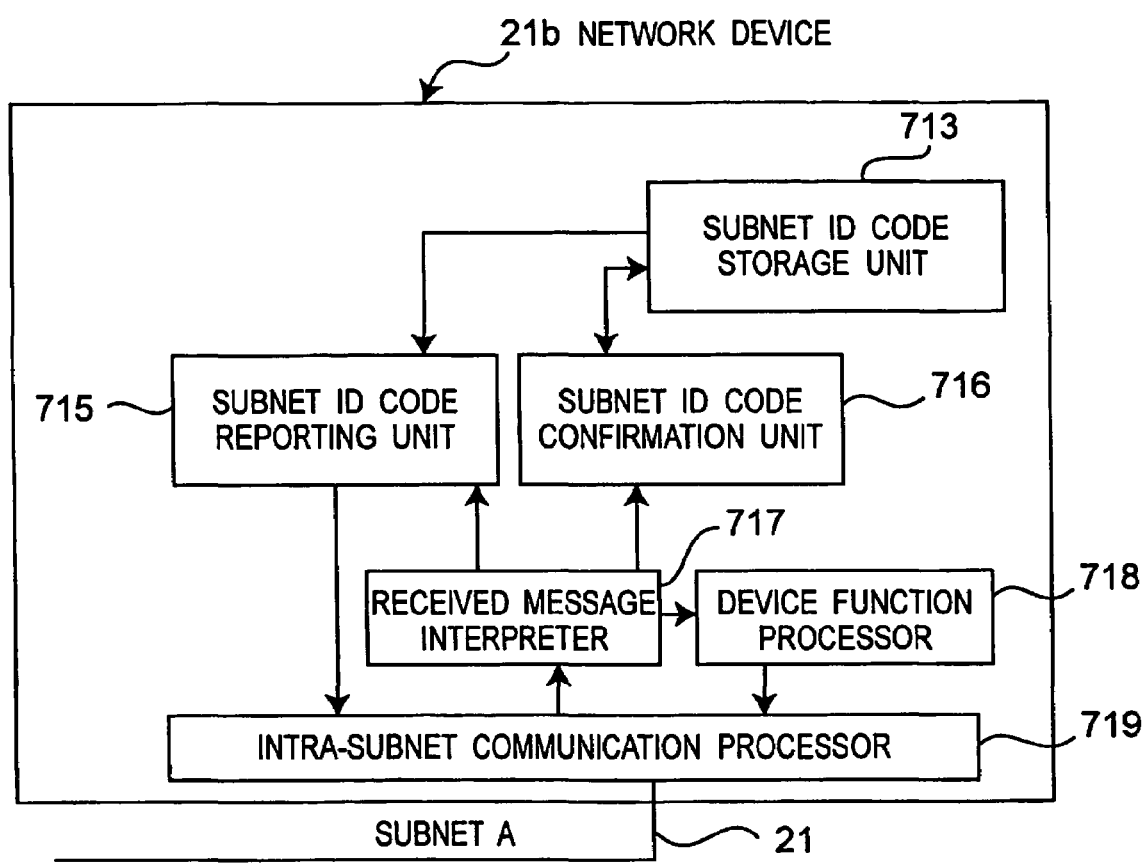
FIG. 10 shows a configuration of a network device connected to a subnet.

The configuration of a network device 21b . . . is described first with reference to FIG. 10. Referring to FIG. 10, the subnet ID code storage unit 713 stores Net ID of the subnet allocated to the network device. The subnet ID code reporting unit 715 returns the own Net ID stored in the device when requested by another router to report the Net ID. The subnet ID code confirmation unit 716 confirms the content of the information requested by the subnet ID code requesting units 314a, 314b of the router shown in FIG. 3. The received message interpreter 717 interprets received messages and passes the result on to a specified device. The device function processor 718 executes the function of the network device according to the received message. The intra-subnet communication processor 719 handles a closed communication within the same subnet.

An operation and process for the router (target router) 31 to acquire a Net ID is described next with reference to the flow chart thereof shown in FIG. 11A.

When the router 31 starts up, it does not necessarily recognize the Net ID of the own subnet as shown in FIG. 4. The target router therefore sends a request over the subnet A to require the Net ID. The subnet ID code requesting unit 314a therefore compiles a message. The Net ID 43 and node ID 44 of subnet A stored in the subnet ID code information storage unit 313 are set to the SNA field of this message. The Net ID 43 of subnet A is, however, not necessarily correct. The Node ID is a temporary value, such as the highest possible value, that is not likely to have been assigned to another node. This temporary value can be variously determined, such as a predetermined value by DIP switches on the router 31 or a value stored before the reset. The destination address DNA is set to a value designating all of devices in the subnet at a broadcast. HD is an identifier denoting a broadcast. The object property code (OPC) is an identifier denoting a Net ID. The object service code (OSV) is an identifier denoting a read request. The object data (ODT) is empty. The values stored to other fields in the message configuration shown in FIG. 6 are not directly related to this embodiment of the invention and consideration thereof is thus omitted here.

HD, SNA, DNA, and ODATA are then passed to intra-subnet communication processor 319a. Because a broadcast is indicated, the intra-subnet communication processor 319a sets a code to denote a broadcast to PR, sets an address for broadcast communication to DA, stores HD, SNA, DNA, and ODATA to the DATA field, and then transmits the resulting message over subnet A. This operation is completed in step S11 in FIG. 11A.

It should be noted that the address used for SA and DA on the subnet of the router can be determined immediately after the router starts up. Therefore, each of SA and DA is in a state operable to function correctly.

A parent router, a general router, and a network device are connected to subnet A, and receives messages in their respective intra-subnet communication processors. An example operation in which the network device receives a message is described below. It should be noted that the parent router and the general router also run the same operation when receiving a message.

Because the received message was broadcast, the intra-subnet communication processor 719 of the network device passes the message to the received message interpreter 717. The received message interpreter 717 then passes DNA to the subnet ID code confirmation unit 716, which compares the own network address stored in the subnet ID code information storage unit 713 with the received DNA for examination. While no particular problem results if the Net ID in the DNA matches the Net ID in the own network address, they usually do not match. The received message interpreter 717 therefore interprets OPC and OSV. As a result of interpretation it is found that the received message indicates Net ID request, and thus the received message interpreter 717 responds to the request and makes a response message without destroying the message.

The network device that received the message checks the hop count and Net ID of the received message. When the Net ID of the source differs from the own Net ID, the network device may destroy the received message even if the hop count is 0. In this case the router increments the Net ID in the message for acquiring the subnet Net ID to resend the message until a Net ID that can be received by the network device is found. A special code causing the network device to not destroy the message regardless of a Net ID mismatch can also be defined and added to the message.

The received message interpreter 717 then instructs the subnet ID code reporting unit 715 to generate a response message. SNA is the own network address stored in the subnet ID code information storage unit 713. DNA is the SNA of the received message. OPC or OSV is an identifier denoting a response to the Net ID request. The own Net ID is written to ODT. The subnet ID code reporting unit 715 then passes HD, SNA, DNA, and ODATA to the intra-subnet communication processor 719. Because SA and DA of the received message are already known to the intra-subnet communication processor 719, it transposes SA and DA, inserts the HD, SNA, DNA, and ODATA to the DATA field, and returns the response.

This operation is completed in step S12 in FIG. 11A.

The intra-subnet communication processor 319a of the router 31 monitors message traffic on the subnet A, captures messages addressed to the router 31, and passes to the received message interpreter 317a the content of the DATA in the response message.

The received message interpreter 317a passes DNA to the subnet ID code confirmation unit 316a. The subnet ID code confirmation unit 316a compares DNA of the message with SNA used in the Net ID request message or Net ID 43 of subnet A stored in the subnet ID code storage unit 313 to confirm if the message was addressed to the router. The received message interpreter 317a interprets OPC, OSV as a response to the Net ID request, and extracts Net ID from ODT and temporarily stores it to the subnet ID code confirmation unit 316a. This operation is completed in step S13 in FIG. 11A.

Because the Net ID request message transmitted by the router 31 is a broadcast message, all devices (including parent router and general routers) on the subnet A receive the message and return the subnet identifier code information stored by the device.

The router 31 also temporarily stores this Net ID to the subnet ID code confirmation unit 316a through the above operation. This process is also completed in step S13 in FIG. 11A.

As previously described above, the router 31 receiving multiple Net IDs, prioritizes Net ID to be selected in order by a parent router, a general router and a network device, selects one Net ID, and stores the selected one to the subnet ID code storage unit 313. Thus, the one Net ID can also be selected from the multiple codes by majority rule when there is no parent router. This enables a communication in which the most numerous device can communicate. It should be noted that a default Net ID, indicating that a Net ID has not been assigned to the subnet, is not selected. Furthermore, if the Net ID previously stored by the router is included in the multiple Net IDs, that Net ID can be selected. This operation enables the router to use a Net ID already assigned and used on the subnet A. This operation is completed in step S14 of FIG. 11A.

Next, the subnet ID code confirmation unit 316a examines the Node ID in the network address received and temporarily stored from each device on subnet A, and writes an unused Node ID as the Node ID 44 of subnet A in the subnet ID code storage unit 313. As described above, if the array of Node IDs contains an unused (skipped) value, this unused value is written. Furthermore, while it is possible that the previously used provisional Node ID duplicates another Node ID, the process described above eliminates the possibility of such duplication. This operation is completed as step S15 in FIG. 11A. Step S15 may not be executed because the communication has been already possible.

It should be noted that while the process described above simultaneously acquires Net ID and Node ID, the router can ask the parent router, general routers, and network devices. This process is shown in the flow chart in FIG. 11B and described briefly below. The target router 31 first asks the parent router, general routers, and network devices to return their Node ID (step S21). The parent router, general routers, and network devices interpret the received messages and accordingly return their own Node IDs (step S22). The target router then interprets the returned messages and confirms that the received messages are responses to the inquiry (step S23), and then selects and stores a Node ID other than one of the plural returned Node IDs (step S24). In this method it is enough to define and use the identifier for OPC denoting a Node ID request and a response.

The router 31 runs the same operation to devices and routers on the subnet B and thereby can acquire Net ID of the subnet B and a unique (unused) Node ID.

The router generates a message requesting the parent router data shown in FIG. 5, that is, the Net ID of the parent router, which is stored in the parent router data storage unit 312 of the parent router and other routers, and using the same procedure described above can acquire and store the parent router data in its parent router data storage unit 312. To accomplish it is enough to provide a parent router data request and an identifier for response in OPC.

Figure 12:
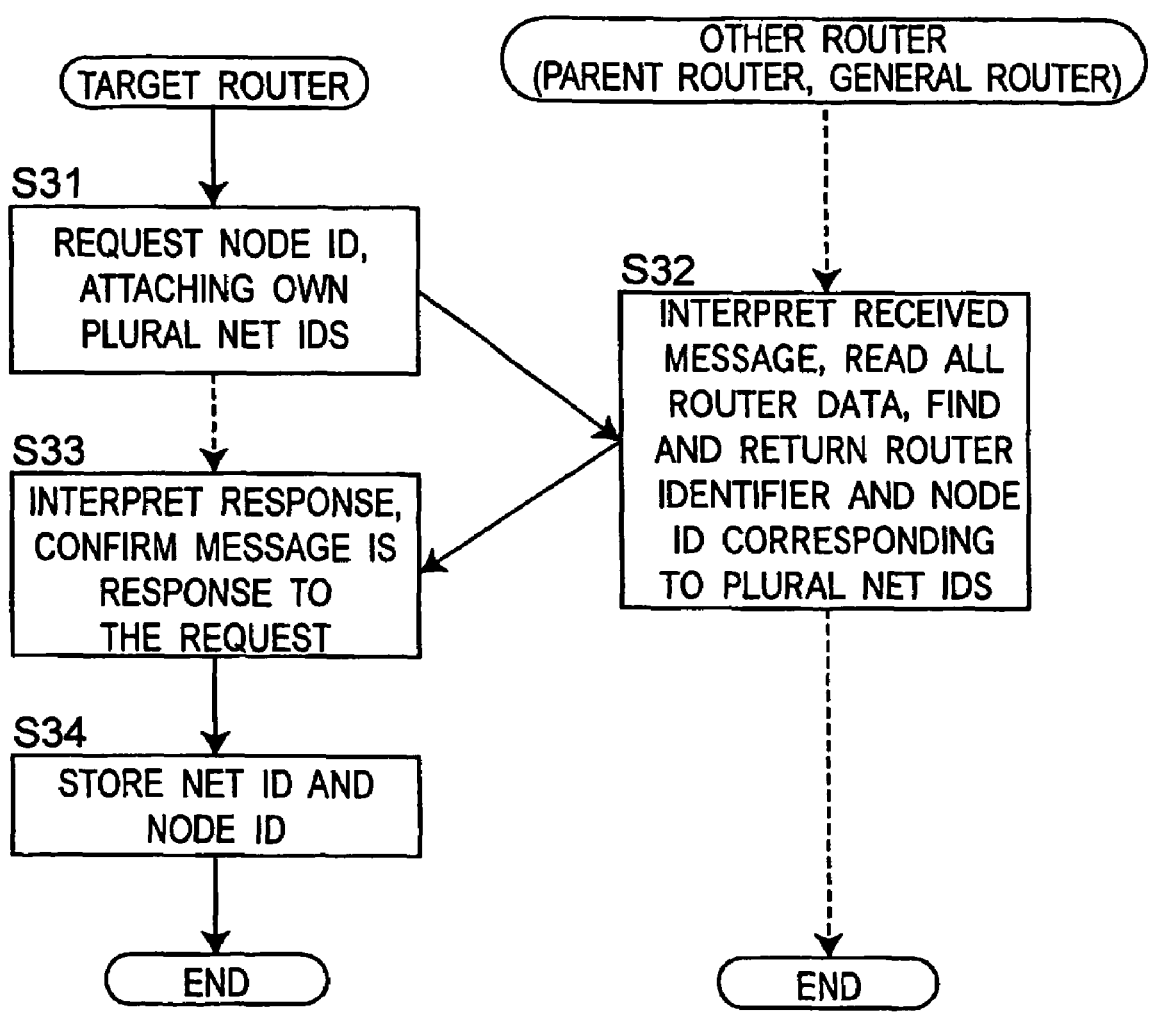
FIG. 12 is a flow chart showing another setup procedure when a router according to the present invention starts up.

An operation and procedure for restoring the Node ID allocated to the router on subnets A and B before the router was replaced or reset is described next with reference to FIG. 12.

The router identifier, Net ID, and Node ID previously allocated to the router 31 are stored in the all router data storage unit 311 of the parent router and general routers using the format shown in FIG. 4. The router 31 compiles a message to the parent router and general routers in which an identifier for requesting the Node ID and router identifier of the target router 31 is written to OPC, the Net ID of subnets A and B obtained from the above operation is written to ODT, and the target router's Net ID and Node ID obtained by the above-described operation are stored to SNA. The router 31 then broadcasts this message to both subnet A and subnet B. This operation is completed in step S31 in FIG. 12.

The parent router and general routers on subnets A and B interpret OPC and OSV in this message. When recognizing the identifier denoting a request for the router Node ID and identifier, they extract Net IDs for the subnet A and B from ODT, and then search the subnet identifier code information for each router in the all router data storage unit for a router having the same subnet IDs. The router identifier, Node ID on subnet A, and Node ID on subnet B are then returned to the target router. For the return, an identifier indicating that ODT contains the Net ID for the router is used for OPC. DNA of the return message can be the Net ID previously obtained and Node ID selected from unused Node IDs, which are in SNA of the message from the target router. The return message does also not need to be broadcast, and can be delivered to just the target router. This operation is completed as step S32 in FIG. 12.

The received message interpreter 317a, 317b of the target router interprets OPC and OSV in the received message to determine that the message is a response to the previous request. Subnet ID code confirmation unit 316a, 316b then extracts the Node ID from ODT, and stores it to the subnet ID code storage unit 313 and the router data storage unit 311. This operation is completed as steps S33 and S34 in FIG. 12.

The router can thus be reset to have the same Node ID used on subnets A and B before the target router was replaced or reset. The target router can thus startup with its router function enabled.

If in the process described above for acquiring Net ID it is determined that the all router data contains Net IDs suggesting that another router connecting the same two subnets as the target router is already present, the parent router or general router announces to the target router that another router is already connecting subnet A and subnet B to make the target router start up not as a router but as simply another network device. This is to prevent forming a loop through multiple routers.

The content of the all router data need not be interpreted by the parent router and general routers to which the request is sent. More specifically, the target router could request the parent router and general routers to return the all router data. The target router then could interpret the returned all router data to detect the Node ID previously assigned to itself thus to check for a router loop. This can be accomplished by assigning an appropriate identifier. The request and response can be generated as described above, and further description thereof is thus omitted here.

In the process described above for acquiring the Net ID, if it is determined as a result of examining all of the Net IDs that data indicating that there is another router connecting the same two subnets as the target router is included in at least one Net ID entry in the all router data obtained from the other routers, the target router starts up not as a router but as simply another network device. This is to prevent forming a loop through multiple routers.

When all router data for routers connected to the subnet is acquired by requesting to routers other than the target router on the subnet connected to the target router, based on information related to a router displacing between the same subnets as the subnet connected to the target router, the router function may be started with Node ID of each subnet connected to the target router changed to be the same as the acquired data. Thus the router can be restored to a status before the replacement or re-start. The other device can use information previously used before to designate the router. It does not need to change settings additionally.

At the change of the target router, or initial start or re-start of the target router, when it is determined that the subnet identifier for the connected subnet in at least one of subnets connected to the target router is a default value (status in which a subnet value is not provided), a routing operation of the message may not be started until the subnet identifier with a default value is provided from the parent router (a routing device having a function to provide a subnet value). Thus when the parent router attends the system, it is possible to provide only a subnet having a default value of the subnet identifier with a new value without changing information of devices having the subnet identifier already assigned. Thus, easy system management can be achieved. This achieves a system in which user's confusion can be reduced at home in a home network and a necessity of an expert is reduced thus to achieve easy exchange of the router, and a depression of the function of the system is suppressed.

If a message addressed to another device on the subnet is received faulty and executed by a device other than the addressed node, the subnet could be disrupted depending upon the content of the message. One method of preventing this is described below.

A hop count indicating the number of passes around the subnet is included in the message header HD using three bits, for example. This hop count is initially 0 and increments one each time a message is passed by the router to another subnet. The hop count is normally 0 if the Net ID in the source network address SNA of the received message matches the Net ID of the receiving device and the device itself. Therefore an error occurs when the Net ID in the source network address SNA of the received message does not match the Net ID of the device and the hop count is 0, and the received message is destroyed. Each device is thus prevented from receiving a wrong message.

However, when the target router requests other routers or network devices to send the Net ID as described above, a Net ID different from the current Net ID of the subnet could be used for the source network address SNA. The problem here is that if the above error handling process is applied the message will not be received and will be destroyed, and it may not be possible to learn the Net ID.

It is therefore preferable to not destroy the message and return the Net ID if OPC is an identifier denoting a Net ID request. SNA of the response message is therefore the same value as the Net ID used by the router requesting the Net ID. The Net ID request message is therefore not destroyed and a response message is transmitted. The target router is able to receive the response normally because the returned Net ID in SNA of the received message and the Net ID of the target router match and the hop count is 0.

If the operating sequence for requesting a Net ID as described above cannot run for some reason, the following process can be applied.

The target router sends a series of messages in which the value of the Net ID in SNA of the Net ID request message requesting the Net ID is sequentially changed. When the Net ID of the device that received the message does not match the Net ID in SNA, a response message is not compiled since this corresponds to the above described error state. When the Net IDs match, however, the error handling process is not run, an appropriate response returned to the target router, and the target router can therefore acquire the Net ID. DNA of the response message is SNA of the received message so that the target router can receive the response. In this way, If the Net ID is 8-bits long, the target router can acquire the Net ID by sending the Net ID request at most 256 times. The request can be sent 256 times by creating and sending 256 unique requests at once, or by sending a request for the next Net ID when a reply is not received within a predetermined time.

Because an error process is not run for messages requesting the Net ID, the present invention can normally quickly determine the Net ID without broadcasting multiple Net ID requests.

If the Net ID in SNA of the received message is a specific value such as 0x00, all devices or routers on the subnet can process the received message according to the contents of the message without destroying it even if the Net ID in the message does not match the own Net ID. The message can be prevented from being destroyed regardless of the value of OPC. It is also possible to process the message without destroying it only when OPC is set to a specific value, for example to the identifier of a message requesting the subnet identifier code or Net ID as noted in the problem of the prior art.

Furthermore, a specific process designation field may be provided in a Net ID request message. If the specific process designation is set, the Net ID can be returned without checking for a match between Net ID in SNA and the own Net ID, or when a mismatch is detected as a checking result.

Yet further, HD, SNA, DNA, OHD, SOJ, DOJ, OPC, and OSV of the received message may be interpreted and a response may be sent except when the message is clearly not addressed to the received devices or routers.

Furthermore, a specific process designation field may be provided in a response message to Net ID request message. If the specific process designation field is set, the received Net ID can be retrieved and stored without checking for a match between the SNA, and self Net ID or Net ID in the network address, or when a mismatch is detected as a checking result.

Yet further, HD, SNA, DNA, OHD, SOJ, DOJ, OPC, and OSV of the received message may be interpreted, and the Net ID can be extracted and stored except when the message is clearly not addressed to the received devices or routers.

As described above, the system is configured so that a response is made to a Net ID request from a network device of which Net ID is set to the different value from the Net ID of the subnet connected to the router, in which the Net ID request is closed in the subnet connected to the network device. Thus, in order to know Net IDs of connected subnets, the router which is replaced or re-started does not need to use with Net IDs of all subnets and therefore data traffic in the subnet can be reduced. A burden in processing of the router which likes to know identifiers of connected subnets can also be reduced.

The configuration and operation of the message generation process and receiving process when requesting the Net ID and Node ID from the router are described above. The same principle can be applied to restore network devices to the previous status by asking the parent router, general routers, and other network devices for the Node ID and Net ID, particularly by requesting the previously used values.

As described above, when a network device connected to one of the plural subnets connected to a router is queried by the router for its Net ID, it returns the own Net ID stored by the device even when the Net ID of the router does not match the Net ID of the device. It is enough to provide a broadcast communication identifier in the header HD.

The object service code OSV described above is an identifier indicating a request service or a reply service for the Net ID, or the Node ID, the parent router data, or the all router data of the destination device. Determining the identifier shall not be so limited, however. In any of the object data header OHD, source object specifier SOJ, destination object specifier DOJ, and object property code OPC, an identifier may be provided to provide a identification function described above.

Furthermore, an identifier such as a router profile or node profile, for example, for classifying the receiver as a parent router, general router, or network device can also be provided. These identifiers may be written in DOJ of the message, for example. The device or router receiving messages captures only those messages with an identifier indicating that device or router. The number of responses can be reduced even when the request message is broadcast over the subnet, and network congestion can therefore be reduced.

Further, an identifier such as a router profile or node profile for classifying the source as a parent router, general router, or network device can also be provided. If this identifier is written in SOJ, for example, devices and routers receiving the response can be configured to capture only those messages with an identifier denoting the same group as that device. It is therefore possible to avoid needlessly processing responses, and the load on the receiving devices can be reduced.

A further identifier for denoting the destination as belonging to a parent router group, general router group, or network device group can also be provided. When the devices and routers then only capture messages containing an identifier corresponding to itself, Net IDs and Node IDs can be efficiently restored as described below.

That is, the target router first creates and broadcasts a message to the parent router asking for the all router data. If there is a parent router, the Net ID and Node ID can be obtained from the all router data stored by the parent router. If there is no response from a parent router, a request for all router data is sent to the general routers. It may be possible to restore the Net ID, Node ID, and router identifier of the target router from the all router data returned from one or more routers.

If there is no response from the general routers, no router is operating on the subnet, and a message requesting subnet identifier codes is sent to the network devices. The subnet identifier code (Net ID data) of the target router can then be restored from the Net IDs and Node IDs collected from the network devices.

By executing a request for Net ID in this sequence, the number of responses sent can be further reduced even when the request is broadcast, and network congestion can therefore be reduced.

What type of information is handled by a particular message can also be determined by providing an identifier in OPC, for example, indicating the type of information (e.g., Net ID or Node ID) requested or stored in ODT. When a further identifier is provided in OSV to indicate whether information is being "requested" or "reported", the destination device or router can recognize what process to run to the value in ODT.

It will also be obvious to one with ordinary skill in the related art that while this embodiment has been described with the router directing traffic between two subnets, subnets A and B, a router for routing traffic among three or more subnets can be achieved by configuring each of the subnets as described above and running the same processes on each of the subnets. It will be further obvious in this case that the subnet identifier code of the router shown in FIG. 4 will have three or more sets of Net IDs and Node IDs, and the number 42 of connected subnets will be 3 or more.

It will also be obvious that each of the means and processors shown in FIG. 3 and FIG. 10 can be configured as dedicated electronic circuits performing the respective operations described above. They can also be achieved by a computer running a computer program implementing the steps of the processes described above with reference to the accompanying flow charts.

From the above description, the network configuration that existed before a router was replaced or reset can be completely restored by gradually extending the communication range to restore communication on the subnets A and B directly connected to the router, restore communication with the parent router (controller 11) or other general routers, and communicate the all router data.

It is therefore possible to replace a router, which is an essential network device, with a router featuring improved performance or a previously used old router for temporary service when a router fails, without requiring a device or network administrator to repeat a complicated configuration process. The present invention therefore provides a router that is particularly convenient and advantageous for the user.

The present invention shall not be limited to this embodiment and can be applied to routers that do not have a router identifier, that do not manage the Net ID and Node ID separately, or that requires an identification number setting as well as the Net ID and the Node ID.

More specifically, included in the scope of the present invention is any method for acquiring, analyzing, and temporarily setting a Net ID and Node ID for the router in order to first enable communication with the connected subnet(s), and then sequentially changing these temporary router settings to gradually extend the communication range using the temporary settings until the final settings are determined.

Furthermore, any apparatus or method for extending the communication range by similar means to a correct data source, such as a controller (parent router) or general router, and then acquiring and setting the correct configuration settings, is also included in the scope of the present invention.

Second Embodiment

The startup sequence of a router in a network including a master router and slave router is described. In addition to the router identifier, Net ID, and Node ID described above, master router data is also provided as the router data. The master router data includes a Net ID and flag identifying the router as a master router.

When the router receives a message relating to a router profile property read request, it returns a response even if the hop count is 0 and the Net ID in the source network address SNA of the received message differs from the Net ID stored by the router. The value of the Net ID in SNA of the response from the router is 0x00 in this case (It should be noted that a specific value indicating that on the receiving side receiving process is performed even when the Net ID in SNA is different from the self Net ID is denoted by 0x00 below).

Therefore, if there is a request relating to such router data as the Net ID, master router data, or all router data, the router can receive the message even if the destination Net ID in the message differs from the own Net ID. (Rule A)

In each device, if the hop count is 0 and the Net ID of the source is 0x00, it receives messages addressed to itself even though the Net ID does not match the Net ID of the device. (Rule B)

As a result, if the device is moved and connected to a physically separate subnet, a new Net ID will be assigned as described below.

First, the device requests a Net ID to the router. According to the rule A the router accepts the request. The router sets its own source Net ID to 0x00 when sending the Net ID to the device, then the device can receive the response.

Figure 7:
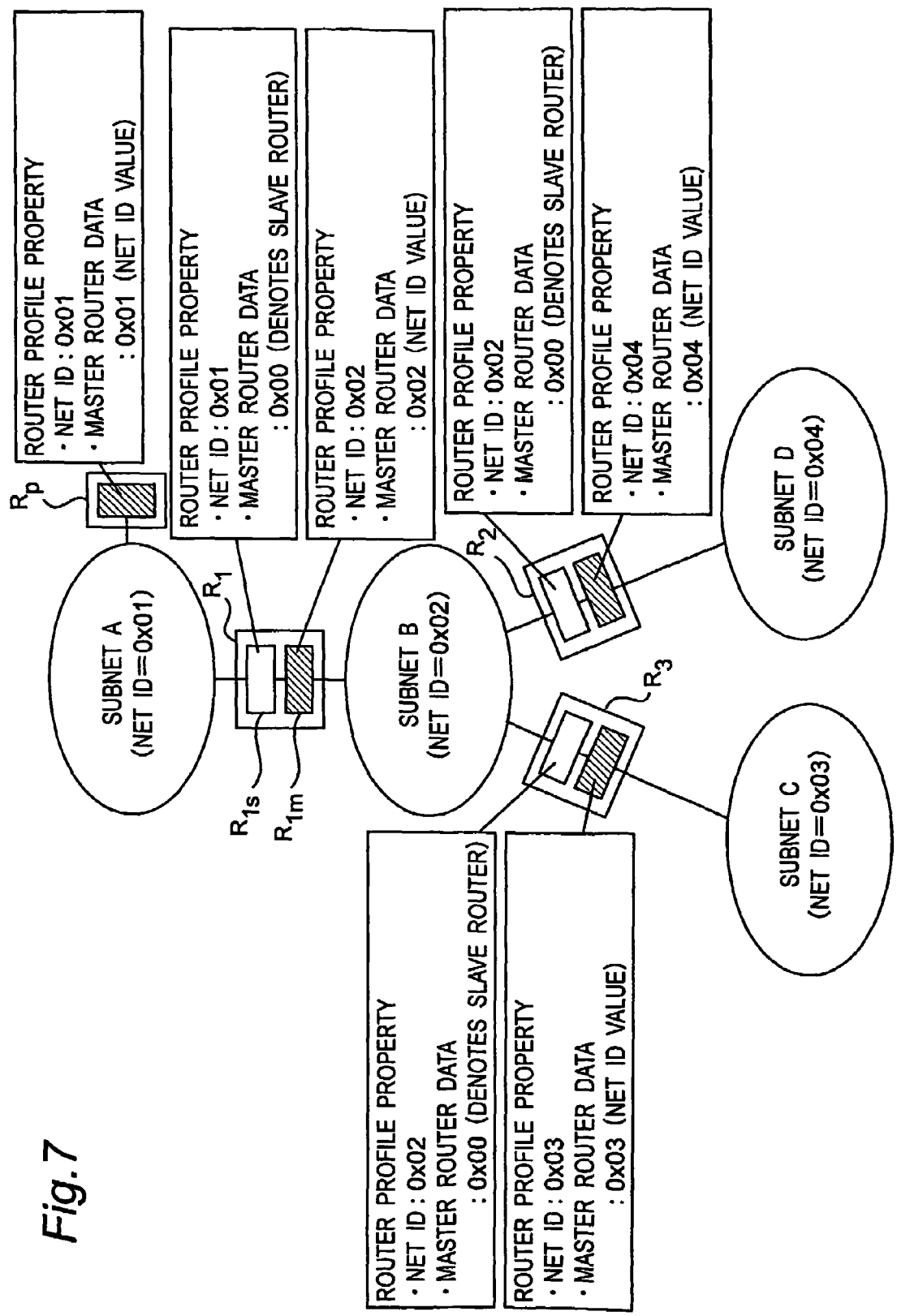
FIG. 7 shows a configuration of a network connected by a router according to the present invention.

The router is internally segmented into a slave router and a master router, as shown in FIG. 7. The slave router is the router which is closer to the parent router, while the master router is the router which is farther from the parent router. If three or more subnets are connected to a single router, there is only one slave; all others are masters.

When there are other routers on the subnet, the router request the master router data to each router on the same subnet at the startup sequence. If the master data indicating that the router is a master router is included in the master router data sent from each router, the Net ID of the master router data for the master router is set as the Net ID of the subnet connected to the target router.

If there is no master router amongst the other routers, they are all slave routers. The Net ID in the returned master router data is therefore not used, and the same process (further described below) run when there is no other routers on the subnet is run.

The process run when there is no other routers on the subnet, that is, when there is no response from routers, is described next.

The target router requests the Net ID to all devices connected to the subnets connected to the target router. It then compares its own Net ID with the Net IDs returned from the devices. If the comparison shows the Net IDs do not match, the target router does not start up as a router. If there is a match, the target router queries the parent router to confirm if the Net ID received from the devices can be used. Based on the data (that is, the all router data) stored by the parent router for each of the routers, the parent router confirms whether the queried Net ID can be used. If the parent router returns permission to use the Net ID, the target router uses that Net ID. If the parent router determines the Net ID cannot be used and therefore prohibits using the Net ID, it returns 0x00 as the router identifier for the target router. In this case, the querying router is prohibited from starting up as a router.

It should be noted that this process can also be used when there is another router on the subnet but a response is not returned by the router.

Only the master router sends a Net ID write request which is sent to devices other than routers. The master router accepts write requests only from the parent router, and the parent router does not accept write requests from other routers.

The configuration of the above-described router and the operation and procedure for setting the Net ID and Node ID based on that configuration are described next. The procedure is described with reference to the flow charts in FIG. 14 to FIG. 16. Note that dotted lines in the flow charts indicate execution of another task or a wait state waiting for a next command.

As noted above a router in this embodiment of the invention includes a master router part and a slave router part. As also noted above the router is connected to two or more subnets.

If two subnets are connected, the router part corresponding to the subnet that is "close to the parent router" (or is "facing the parent router") is the slave router part, and the remaining part is the master router part. Which part becomes the master router is thus determined according to the overall network configuration, including the location of the parent router and how the subnet is connected. In the configuration shown in FIG. 7, for example, there is a router R1 connecting subnet A and subnet B, and the parent router Rp is connected to subnet A. If router R1 is the master router for subnet B, the side of router R1 farther from parent router Rp is master router part R1*m* and the side close to parent router Rp is slave router part R1*s*.

In the router configuration shown in FIG. 3 the side connected to either subnet A or subnet B is the master router. Router attribute data is provided to identify the master and slave parts. In addition to the subnet identifier code configuration shown in FIG. 4, master router data is provided for each subnet, i.e., subnet A master router data and subnet B master router data are provided. An area to store the master router data is also provided. In other words, as shown in FIG. 13, master router data 47 for subnet A is provided in addition to Net ID 43 of subnet A and Node ID 44 of subnet A. Subnet B master router data 48 is also provided in addition to Net ID 45 of subnet B and Node ID 46 of subnet B. These subnet identifier codes are stored to the subnet ID code information storage unit 313.

The all router data storage unit 311 stores the subnet identifier codes including this master router data for all routers in a table, for example. The parent router data storage unit 312 stores the master router data in addition to the parent router Net ID and Node ID. The master router data comprises two values, the Net ID of the connected subnet and a master identifier code for identifying the master router and slave router.

The Net ID in the router attribute data for the master router part is the Net ID of the connected subnet, and the Net ID in the master router data for the slave router part is 0x00, for example. It should be noted that 0x00 is a value not used as a Net ID. In one exemplary embodiment the router attribute data is a 2-byte value, the first byte storing a master router identifier indicating a master router or slave router (where a master router=0x41 and a slave router=0x42), the second byte storing the Net ID.

FIG. 7 shows a network with subnets A, B, C, D linked with routers having a master router part and a slave router part. So that the plural routers do not create a loop, general routers R1, R2, R3 are arranged in one direction towards parent router Rp. The part of each router closer to the parent router Rp on this path is the slave router and the other part is the master router. Of the plural routers connected to each subnet, only one is connected as a master router and all others are connected as slave routers. A loop results if there are two master routers on a single subnet. Therefore, if two or more master routers are detected the routers can be prevented from starting up, an error can be detected and a standby state imposed, or other appropriate action can be taken. If a router is managing traffic between three or more subnets, there is only one slave router part inside the router.

The Net ID of each connected subnet is stored in the Net ID of the master router data for the master router part of each router. In the example shown in FIG. 7 the Net ID for each subnet A, B, C, and D, that is, 0x01, 0x02, 0x03, and 0x04, is stored as to the Net ID in the master router data of the master router part.

As described above with reference to the message configuration shown in FIG. 6B, message content in the present embodiment is stored to the DATA field. The DATA field contains a header HD, source network address SNA, destination network address DNA, and object message ODATA. The object data ODATA field stores the object message header OHD, source object specifier SOJ, destination object specifier DOJ, object property code OPC, object service code OSV, and object data ODT.

For the destination object specifier DOJ, provided are either a router profile identifier code (0x0EF101) denoting a router data to be handled, and a node profile identifier code (0x0EF001) denoting a network address for the node to be handled.

For the object property code OPC, provided are a master router data property (0xE6) denoting master router data to be handled, Net ID property (0xE1) denoting a Net ID to be handled, a parent router data property (0xE3) denoting parent router data to be handled, all router data property (0xE4) denoting all router data to be handled, a router registration request property (0xE5) indicating a router registration request to be handled, a router information property (0xE0) denoting the own router data to be handled, and an instance change class announce property (0xD5) indicating an instance change to be handled.

For the object service code OSV, provided are a read request (0x62), a report request (0x63), a write request (0x60) and (0x61), and a report (0x73).

For the destination network address DNA, an intra-subnet broadcast (0x01FF) is provided.

Figure 14:
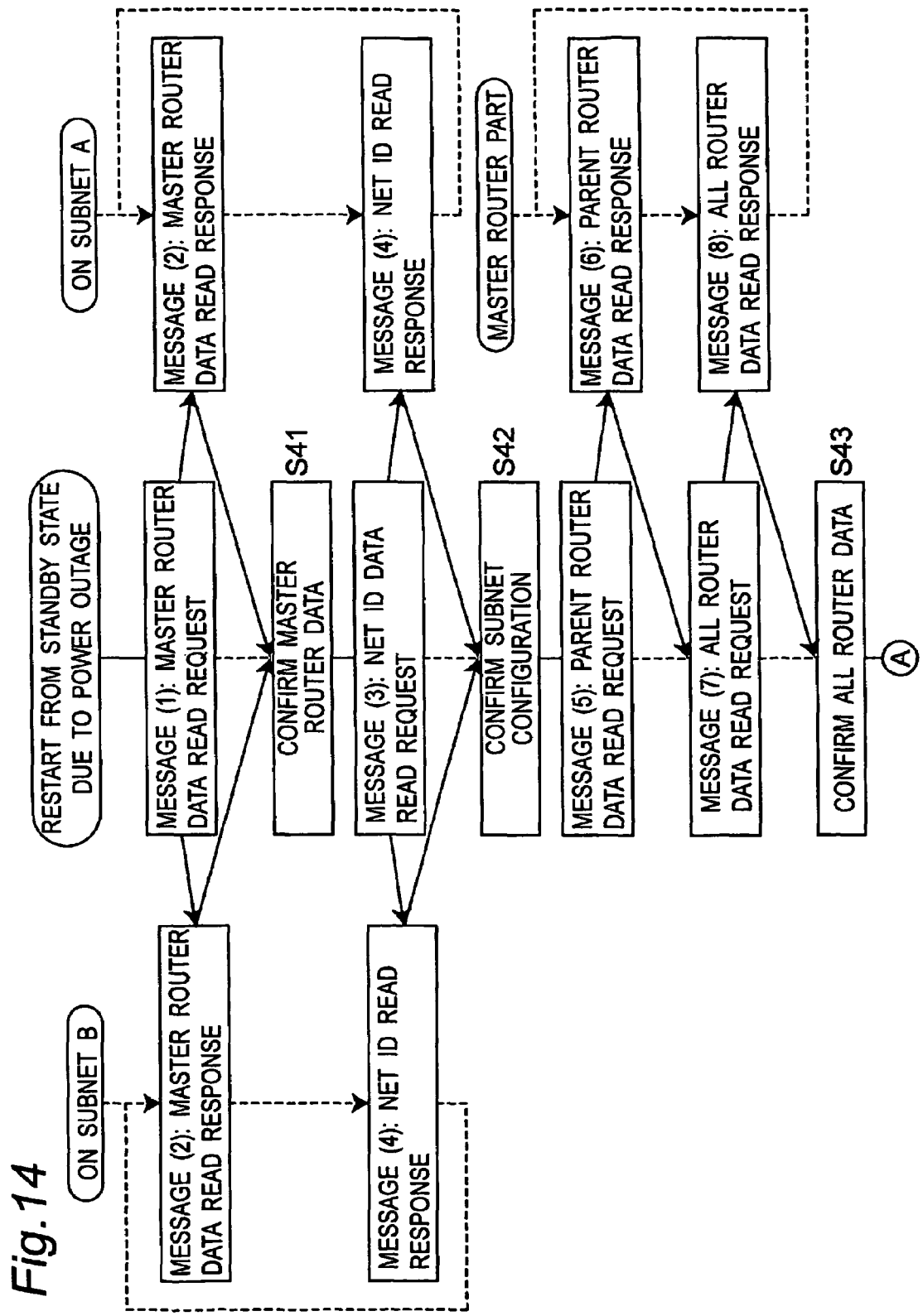
FIGS. 14 and 15 are flow charts showing the setup procedure when a router according to the present invention starts up.
Figure 15:
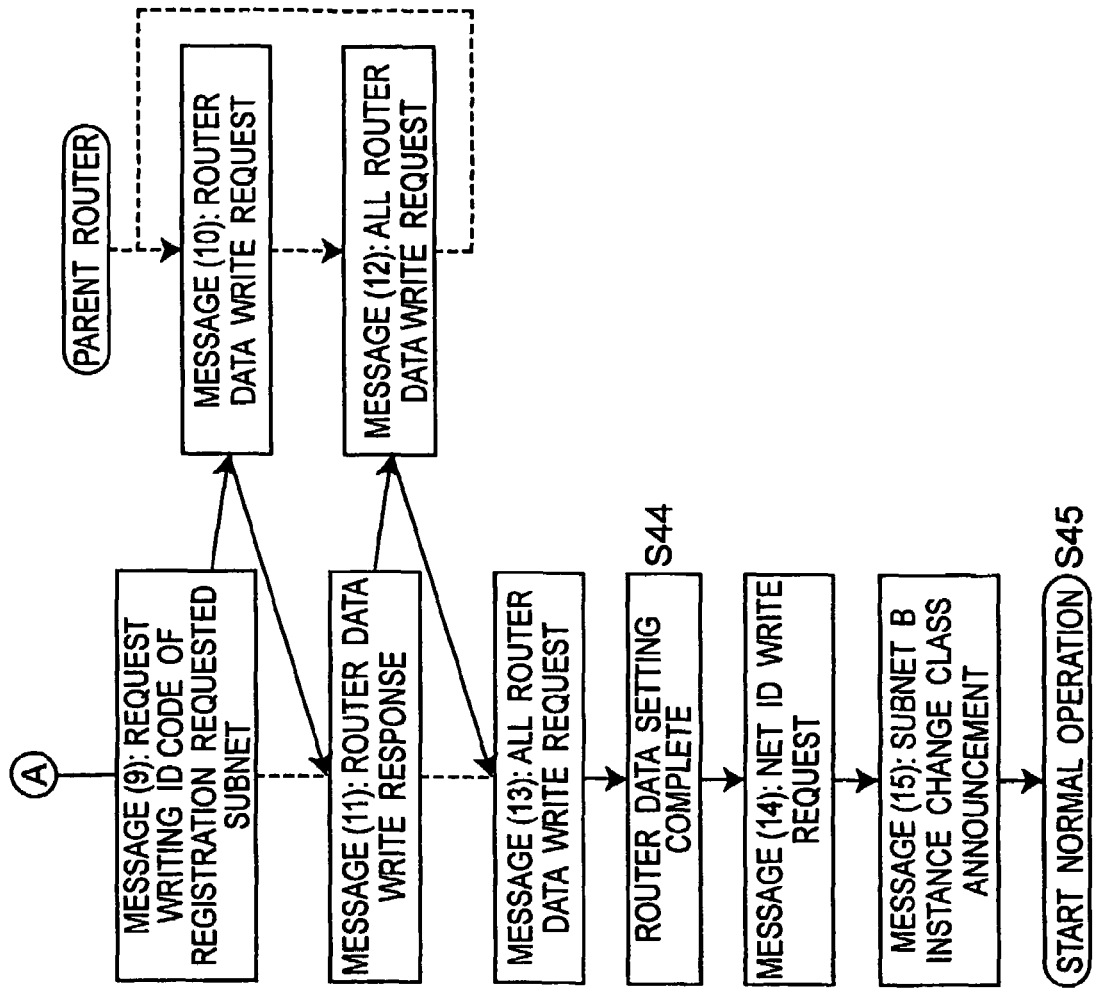

A procedure for restoring and re-registering the network address when a router reconnects to a subnet from a stand-by state due to a power outage and so on is described with reference to the flow charts in FIG. 14 and FIG. 15. The router connected to subnet A and subnet B shown in FIG. 7 is the target router in the following description.

The target router first broadcasts a message (1) through subnets A and B to have all routers including the parent router on subnets A and B report the master router data. The message (1) in this instance is defined as follows.

SNA: a network address of the target router stored therein

DNA: a code denoting intra-subnet broadcast with HD denoting a broadcast

DOJ: a code denoting a router profile object (0x0EF101)

OPC: a code denoting a master router data property (0xE6)

OSV: a code denoting a read request (0x62)

ODT: any data

If there are other routers on subnet A or subnet B, each other router returns a master router data read response in a message (2). The message (2) in this time is defined below.

SNA: a network address stored in the other router with Net ID set to 0x00

DNA: SNA from the message (1)

DOJ: a code denoting a router profile object (0x0EF101)

OPC: a code denoting a master router data property (0xE6)

OSV: a code denoting a read response (0x72)

ODT: master router data of the other router

In step S41, the target router then receives and interprets the returned messages (2) to examine the collected master router data. When master router data indicating that the router is not a slave router is returned from two or more routers, a loop exists or may exist on the network. The target router therefore starts up as a simple network device or in a standby mode, and the router function is not enabled. When there are 1 or 0 master routers, the procedure advances to the next step. A flow chart of the operation of step S41 is shown in the flow chart in FIG. 16A.

Figure 16C:
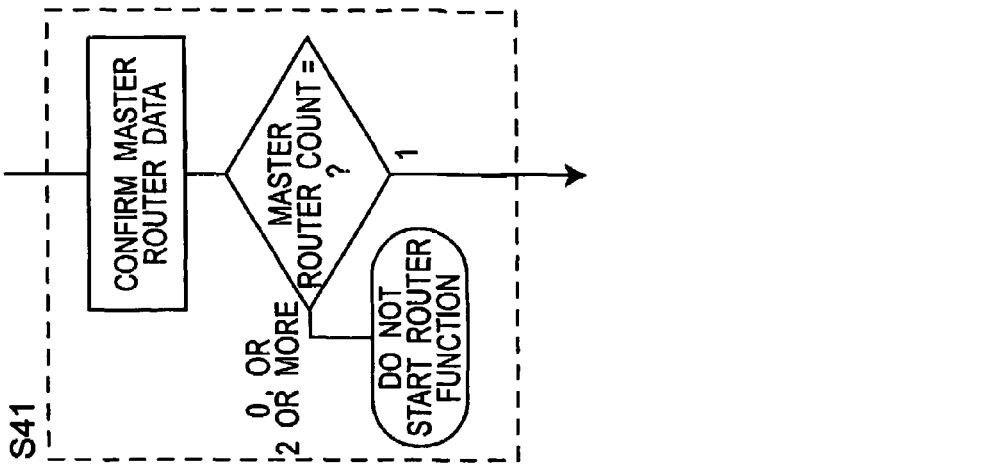
FIGS. 16A to 16C are flow charts showing selected steps in the flow chart of FIG. 14 in detail.

It should be noted that it is also possible to not enable the router function if there is no other master router on the network as indicated in FIG. 16C. This case is described further below.

When no message (2) is returned, there is no other router on the network. The target router therefore boots as a network device or enters a standby state.

When it is confirmed that the number of master routers on the subnet is 0, the Net ID recovery routine is run. In this routine the target router asks all devices on subnets A and B to return their Net ID by broadcasting message (3). The message (3) is defined as follows.

SNA: network address of the target router stored therein with the Net ID set to 0x00

DNA: a code denoting intra-subnet broadcast

DOJ: a code denoting a node profile object (0x0EF001)

OPC: a code denoting a Net ID property (0xE1)

OSV: a code denoting a read request (0x62)

Since the hop count is 0 and the Net ID in SNA is 0x00 in message (3), each device on subnets A and B receives a message (3) and responds to the request by returning the Net ID set in the respective device in a message (4). The message (4) is defined below.

SNA: a network address of the device

DNA: SNA in the message (3)

DOJ: a code denoting a node profile object (0x0EF001)

OPC: a code denoting a Net ID property (0xE1)

OSV: a code denoting a read response (0x72)

ODT: Net ID (may be network address including Node ID)

In step S42, the target router compares the subnet configuration indicated by the Net IDs collected from messages (4) with the subnet configuration stored by the target router when the number of master routers is 0. If those subnet configuration differ, the target router does not enable the router function.

If the number of master routers is 0 and the stored subnet configuration is the same as the confirmed subnet configuration, the target router starts up with its router function enabled based on the stored configuration settings.

If the number of master routers is 1, the target router communicates with the master router using messages (5), (6) and messages (7), (8) to acquire the parent router data and all router data. It should be noted that the master router could be the parent router.

The message (5) is defined as follows.

SNA: network address stored in the target router or the network address with the Net ID set to 0x00

DNA: a code denoting the master router obtained by the message (2)

DOJ: a code denoting a router profile object (0x0EF101)

OPC: a code denoting a parent router network address property (0xE3)

OSV: a code denoting a read request (0x62)b

The master router receives and interprets the message (5), then compiles and sends message (6). The message (6) is defined as follows. SNA stores network address of the master router. DNA stores SNA in the message (5). DOJ stores a code denoting router profile object (0x0EF101). OPC stores a code denoting parent router network address property (0xE3). OSV stores a read response (0x72). ODT stores parent router data.

Message (7) is defined as follows. SNA stores the stored network address or stored network address with the Net ID set to 0x00. DNA stores a code denoting master router. DOJ stores a code denoting router profile object (0x0EF101). OPC stores a code denoting all router data property (0xE4). OSV stores a code denoting a read request (0x62).

The master receives and interprets message (7), and then compiles and returns message (8). Message (8) is defined as follows. SNA stores a network address of the master router. DNA stores SNA in the message (7). DOJ stores a code denoting router profile object (0x0EF101). OPC stores a code denoting all router data property (0xE4). OSV stores a code denoting a read response (0x72). ODT stores all router data.

In step S43 the router then interprets message (6) and message (8) to acquire the parent router data and all router data. If a network address of a router connecting subnets A and B is included in the all router data, the router uses the network address and enables the router function. Whether the network address for the router is included can be determined from Net IDs for the subnets A and B and the all router data obtained from message (4) or messages (2) and (4).

If there is no parent router, the all router data is obtained from the master router. If the data stored by the router and the data from the master router matches the subnet configuration confirmed in step S42, the router starts up as a router using the stored data, and the steps following step S42 are unnecessary. If these three do not match, the router function is not enabled, the rest of the sequence is not necessary, and the router boots as a network device or enters a standby state.

If the number of master routers is 0, that is, there is no master router on subnets A and B, or if the configuration of subnets A and B is unknown or uncertain, such as when the master router count is 0 and in step S42 the subnet configuration stored by the router does not match the configuration of subnets A and B indicated by Net IDs collected from all device nodes, the router sends a router registration request to the parent router if the subnet identifier code of the parent router is known. To accomplish this the following messages (9), (10), (11), (12), and (13) are exchanged with the parent router.

Message (9) is defined as follows. SNA stores a Net ID for subnet A connected to the master router part. DNA stores a code denoting a parent router identified in the message (6). DOJ stores a code denoting a router profile object (0x0EF101). OPC stores a code denoting a router registration request property (0xE5). OSV stores a code denoting a write request (0x60).

The parent router considers the registration request and interprets the all router data to confirm there are no conflicts, such as loop path. Then the parent router assigns a router identifier, Net ID, Node ID, and master router data for the router, and responds to the requesting router via message (10) to request writing the data to the subnet ID code storage unit 313.

Message (10) is therefore defined as follows. SNA stores a network address of the parent router. DNA stores SNA in the message (9). DOJ stores a code denoting a router profile object (0x0EF101). OPC stores a code denoting a router data property (0xE0). OSV stores a code denoting a write request (0x61). ODT stores the own router data for the router, that is, router identifier, Net ID, Node ID, and number of connected networks.

The router then receives and interprets message (10), stores the assigned router identifier, Net ID, and Node ID to subnet ID code storage unit 313, and returns a message (11) to notify the parent router of completion of the data storage.

This message (11) is defined as follows. SNA stores assigned network address. DNA stores network address of the parent router. DOJ stores a code denoting a router profile object (0x0EF101). OPC stores a code denoting an own router data property (0xE0). OSV stores a code denoting a write response (0x71). ODT is empty.

When the parent router receives message (11), it sends the all router data to the router in a message (12).

This message (12) is therefore defined as follows. SNA stores a network address of the parent router. DNA stores a network address assigned to the router. DOJ stores a code denoting a router profile object (0x0EF101). OPC stores all router data property (0xE4). OSV stores a code denoting a write request (0x61). ODT stores all router data.

The router then receives and interprets message (12), stores the all router data to all router data storage unit 311, and returns message (13) to notify the parent router of completion of the data storage.

This message (13) is therefore defined as follows. SNA stores an assigned network address. DNA stores a network address of the parent router. DOJ stores a code denoting a router profile object (0x0EF101). OPC stores a code denoting all router data property (0xE4). OSV stores a code denoting a write response (0x71). ODT is empty.

The router thus obtains the router data in step S44.

The router then sends message (14) to write the assigned Net ID to each device on the master side of subnets A and B.

This message (14) is therefore defined as follows. SNA stores a network address for subnet A or B. DNA stores a code denoting intra-subnet broadcast code (0x01FF). DOJ stores a code denoting a node profile object (0x0EF001). OPC stores a code denoting a Net ID property (0xE1). OSV stores a code denoting a write request code (0x60). ODT stores a Net ID.

The router also announces a change in status of both subnets A and B by broadcasting a message (15).

This message (15) is defined as follows. SNA stores a network address for subnet A or B. DNA stores a code denoting a broadcast over domain. DOJ stores a code denoting a node profile object (0x0EF001). OPC stores a code denoting an instance change class announce property (0xD5) indicating a change in configuration settings. OSV stores a code denoting a announce (0x73). ODT stores instance data to be stored.

As described above, this operation enables the router to start up and start normal operation.

Figure 16B:
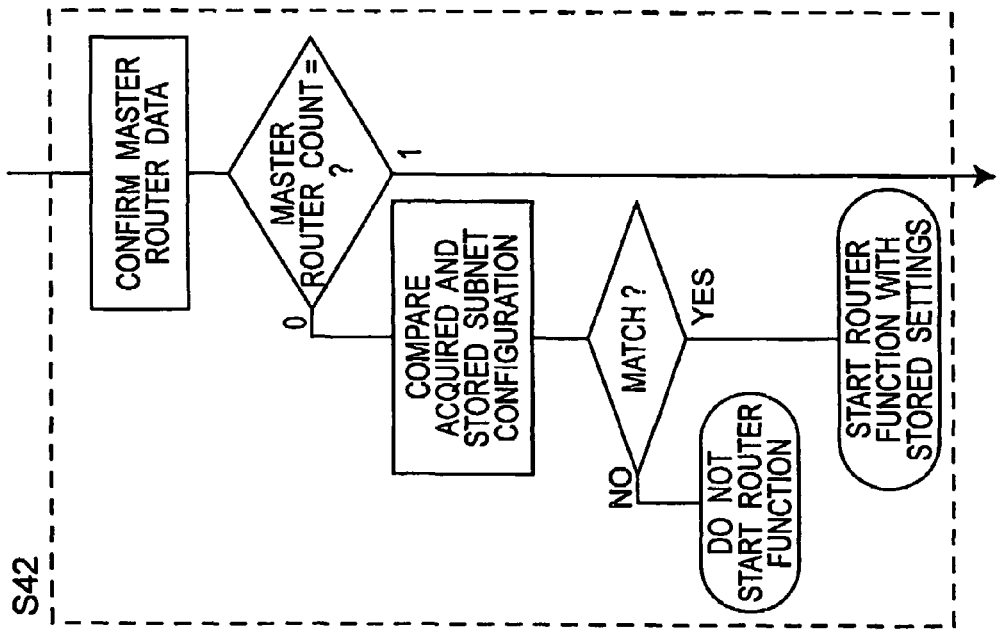
Figure 16A:
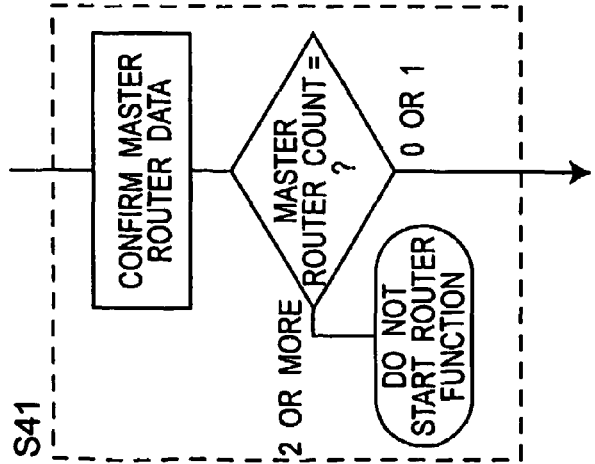

It should be noted that the present embodiment collects the Net IDs stored by each device on the subnets from messages (3) and (4) even when the number of master routers is 1, as shown in FIGS. 16A and 16B. However, if there is one master router, then the Net ID of the router can be known for subnets A and B from the all router data and parent router data stored by the master router, and processing messages (3) and (4) can therefore be omitted.

Furthermore, when master router data denoting a master router is returned it is also possible to trust the Net ID contained in the master router data, and by setting that Net ID to the Net ID for the router other steps relating to setting the Net ID can be omitted.

As further shown in FIG. 16B and described above, in case the number of master routers is 0, when and the same subnet configuration is identified by the collected (returned) data and the data stored internally by the router, the router function can be enabled using the stored information. If the configurations differ, the router can start up as a network device without enabling the router function. The router function is disabled in this case, an error message may be reported to the router.

It is also possible to not boot up the router in step S41 when the number of master routers is 0 as shown in FIG. 16C.

In other words, if the collected master router data all indicate slave routers, there may possibly be no parent router or other router, or there may be a router malfunction, and a path to the parent router cannot be determined. The router therefore starts up as a network device or enters a standby state.

It should be noted that above master router data is a combination of a Net ID and a master identifier code, but the master router data could be composed of only the master identifier code with the Net ID for the slave router part set to 0x00 and the Net ID for the master router part set to the Net ID of the subnet connected to the master router part.

It will also be apparent that the Node IDs are already assigned when a network on a lower layer closed in each subnet starts up, and these Node IDs can be converted to and used as a Node ID in a subnet identifier code within the network domain linking plural subnets to which the present invention is directed.

This embodiment of the present invention can thus easily prevent the routers from creating a loop. A router managing a subnet operates as the master router for the subnet and managing subnet identifier codes is easier. Furthermore, when this router is newly added to the network (a cold start) or is temporarily removed from and then reconnected to the network without resetting (a warm start), the router identifier, Net ID, all router data, and master router data can be set or restored to the router in a short time.

It should be noted that a recording medium recording a program for the router and the set up method of the router according to the present invention includes any computer-readable data storage medium capable of recording the program, including ROM, RAM, floppy discs, CD-ROM, DVD, memory card, or hard disk, or a communication medium such as telephone lines or other transmission medium.

Third Embodiment

The above embodiments describe a process for assigning a Net ID and Node ID to a router that is newly connected or restarted. This process for assigning a Net ID and Node ID can also be applied to a network device for which the network connection has changed. This application of the process to network devices is described below.

This embodiment applies to a case in which a device connected to one subnet is moved and connected to a different subnet, such as when, referring to FIG. 2, the device 1 (22a) connected to the subnet B is moved and connected to the subnet A, and a Net ID and a Node ID are allocated to the device 1 (22a) at the new network connection.

When a device is moved to a different subnet, the Net ID stored in the network device will differ from the Net ID of the subnet to which the device is newly connected. Furthermore, since the Node ID must only be unique within a subnet, the Node ID could be the same as another Node ID already used on the new subnet.

In such cases the device 1 (22a) can query other network devices connected to subnet A for the Net ID to acquire an appropriate Net ID. The device 1 (22a) can also query other devices on the subnet A to acquire their Node IDs and thereby find an unused Node ID.

This is described more specifically below.

When the device 1 (22a) moves to a different subnet, it first sets its own temporary Node ID. This temporary Node ID should be a number that is likely not already used on the subnet. It also sets a temporary code indicating that "Net ID is unspecified" until its own Net ID is set to the Net ID of the subnet A. These temporary settings enable the device 1 (22a) to communicate with other devices on the subnet A.

The device 1 (22a) then queries the other devices on subnet A for the Net ID. It then sets its own Net ID with reference to a Net ID returned by the other devices. In this case, the device 1 (22a) may prioritize the Net IDs using a majority rule as described above. Similarly the device 1 (22a) then queries the other devices on subnet A for the Node IDs, and sets its own Node ID to a value that will not duplicate an existing Node ID.

It should be noted that the device 1 (22a) could query the other devices to confirm whether or not the Node ID set to the device, before the temporary Node ID was set, is already in use on the same subnet. If it is not already used, the device 1 (22a) could continue to use the same Node ID.

Furthermore, the Net ID is temporarily set to "unspecified" as noted above, but it could be set to a reserved code enabling communication only within the same subnet to which the device is connected. The Net ID could also not be used.

When a network device changes its Net ID or Node ID it also sends the changes (the Net ID and Node ID before the change, and the Net ID and Node ID after the change) to the parent router and general routers to update the all router data.

The router data can be updated by the device for which settings changed reporting the changes to the router. Alternatively, the parent router or general router could examine each subnet based on an error event which occurs when another device or router performs a communication to the network device that moved, and automatically update the router data related to the network device that moved.

The same process can also be applied to a new device connected to a subnet, and is thus not limited to network devices that move to a different subnet. In this case it is not necessary for the parent router to assign a Net ID and Node ID, the device can automatically set its own Net ID and Node ID, and the processing load on the parent router can be reduced.

When the hop count of a received message is 0 and the value of the source Net ID in the received message differs from the value of the Net ID in its own network address, the network device destroys the received message. However, when the hop count is 0 and the source Net ID is 0x00, the network device does not destroy the message if the message is addressed to itself and thus receives the message.

Furthermore, if the message relates to a router data request, the router receives and replies to the message even if the Net ID of the source is different from that of the router.

Fourth Embodiment

Description is made to two types of startup sequences for a general router or a general network device other than the router, including a cold start and a warm start. "A cold start" is a startup sequence that runs an initialization process that erases all network address data from a previous startup sequence. "A warm start" is a startup sequence that runs an initialization process while keeping previous network address and initialization settings.

A. Startup Sequence of General Network Device

The startup sequence of a general network device is described specifically below.

At startup a network device begins by acquiring a network address for recognizing and specifying itself. As noted above the network address includes a Net ID and a Node ID. It is assumed below that the Node ID has already been obtained at the time the network device starts operating, and the following two sequences are defined for acquiring the Net ID.

1) Basic sequence for a cold start
2) Basic sequence for a warm start

A cold start is a reset start of a network device in which the network address is reset. A warm start is a start with a previously set Net ID retained in which the network address has already been set.

The concept of a "default router" is introduced in the above basic sequences. Network devices exchange data using a network address that identifies the network device without being aware of any subnets. Devices that have the same Net ID in the network address are on the same subnet, and can send messages directly to another network device by specifying the MAC address. However, if the Net ID of the network address of one device is different from the Net ID of others, the devices are on different subnets connected via a router, and routing is necessary in order to exchange data. Therefore the concept of a default router is introduced to make it easier for each non-router network device to process messages transmitted to network devices on other subnets.

When setting the Net ID, each non-router network device internally stores the network address of one of plural routers connected to the same subnet as "default router" data. Messages sent to network devices on another subnet can then be simply sent to the default router regardless of the subnet of the destination device. Which router is defined as an own default router is not specifically defined.

A. 1 Startup Sequence for Cold Start of Network Device

During a cold start, a network device acquires a Node ID from a lower communication layer or a setting on an application software, and the network device then acquires a Net ID via the subnet. The basic sequence whereby a network device on the subnet acquires the Net ID during a cold start is described below.

Figure 17:
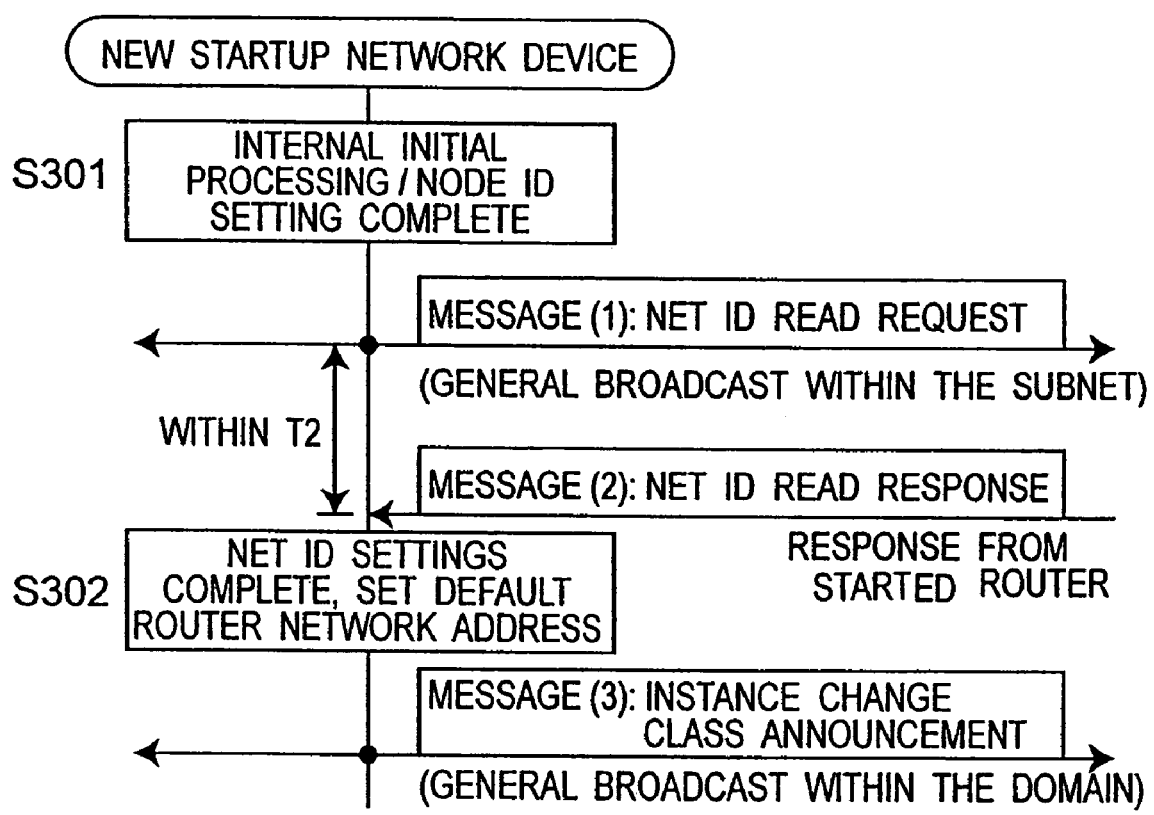
FIG. 17 shows a startup sequence for a cold start of a general network device.

FIG. 17 shows the basic cold start sequence of a network device. This is the basic sequence run after the Node ID is set (that is, after communication within the subnet is enabled). Messages (1) to (3) in FIG. 17 are set as follows.

TABLE 1

| | |
|---|---|
| Message (1) | SNA: default value (0x00)<br>DNA: broadcast within the subnet (0x01FF)<br>DOJ: router profile object (0x0EF101)<br>OPC: Net ID property (0xE1)<br>OSV: read request (0x62) |
| Message (2) | Individual response message<br>SNA: value of router's network address with Net ID set to 0x00<br>DNA: SNA in message (1)<br>Specifying read response to message (1)<br>(SOJ = 0x0EF101, OPC = 0xE1, OSV = 0x72, ODT = Net ID information) |
| Message (3) | SNA: specifying self network address with assigned Net ID<br>DNA: broadcast within the domain (0x00FF)<br>SOJ: node profile object (0x0EF001)<br>OPC: instance change class announce property (0xD5)<br>OSV: announcement (0x73) |
| T2 | Time-out waiting for message (2).<br>If message (2) is not received after waiting time T2, 0x00 is set as the Net ID. |

Referring to FIG. 17, when a network device is newly connected to a subnet and setting the Node ID is completed (S301), a message (1) is broadcast throughout the subnet. The message (1) requests reading the Net ID of routers that have already started up on the subnet. If a response message (2) is received from a router within the specified time T2, the network device acquires the Net ID from the response message (2), sets its own Net ID with the acquired Net ID, and sets the network address of its own default router to a specified value (S302). It then broadcasts frame (3) throughout the domain, and accounces a status change.

A.2 Startup Sequence for Warm Start of Network Device

The basic sequence of a warm start is described with reference to FIG. 18 and FIG. 19.

A warm start occurs when a network device with network address data being hold is reconnected to the subnet or restarted from the state where the device is disconnected from the subnet or the standby state.

Figure 18:
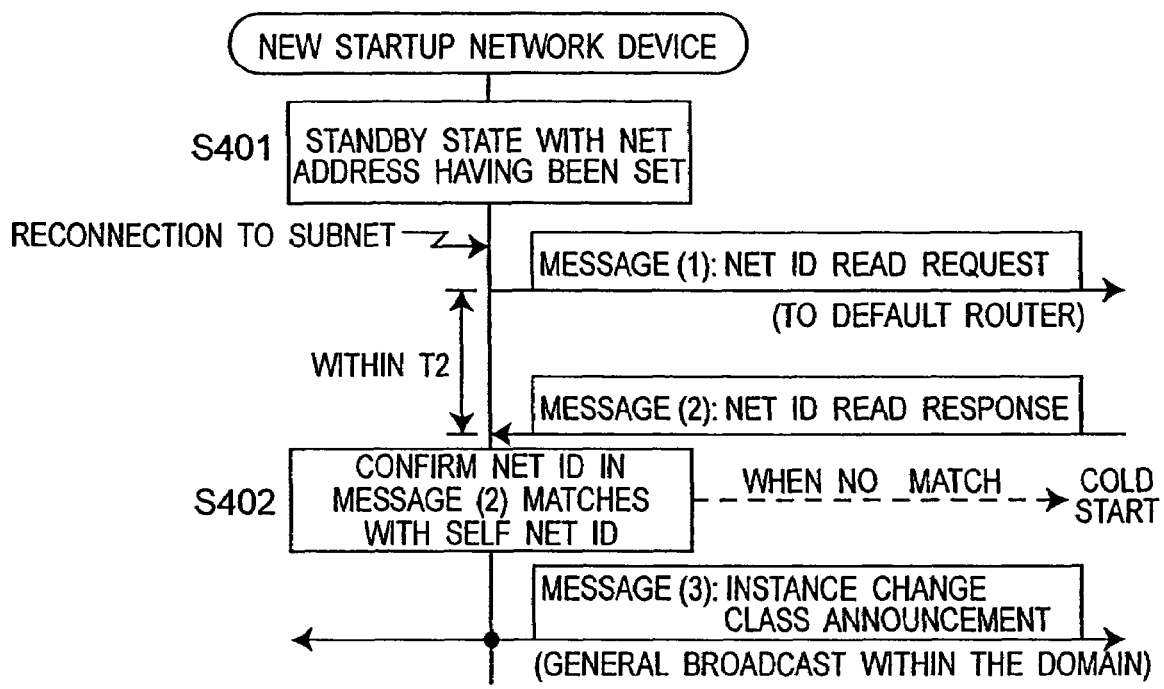
FIG. 18 shows a startup sequence for a warm start of a general network device (when there is a response to Net ID read request)

FIG. 18 shows a sequence to run when a Net ID read request is sent to the default router, and a response message to the read request is received within the specified time T2. FIG. 19 shows a sequence to run when a response message to the read request is not received within the specified time T2, that is, when there is no response.

First, the basic warm start sequence shown in FIG. 18 is described. Messages (1) to (3) in FIG. 18 are set as follows.

TABLE 2

| | |
|---|---|
| Message (1) | SNA: self network address that has been already set<br>DNA: default router address<br>DOJ: router profile object (0x0EF101)<br>OPC: Net ID property (0xE1)<br>OSV: read request (0x62) |
| Message (2) | Individual response message<br>SNA: router's network address with Net ID set to 0x00<br>DNA: SNA in message (1)<br>specifies read response to message (1)<br>(SOJ = 0x0EF101, OPC = 0xE1,<br>OSV = 0x72, ODT = Net ID data) |
| Message (3) | DNA: broadcast within the domain (0x00FF)<br>SOJ: node profile object (0x0EF001)<br>OPC: instance change class announce property (0xD5)<br>OSV: announcement (0x73) |

TABLE 2-continued

| | |
|---|---|
| T2 | Time-out waiting for message (2).<br>(60 seconds: for design guideline) |

Referring to FIG. 18, when a network device is reconnected to a subnet from a standby state in which the network address is already set (S401). Message (1) is sent to the default router to request reading the Net ID. If a response message (2) is received from the default router within the specified time T2, the network device checks whether the Net ID in the response message (2) matches the Net ID stored by the device (S402). If the Net IDs do not match, the cold start sequence runs. If the Net IDs match, a message (3) is broadcast throughout the domain and a state change is announced.

Figure 19:
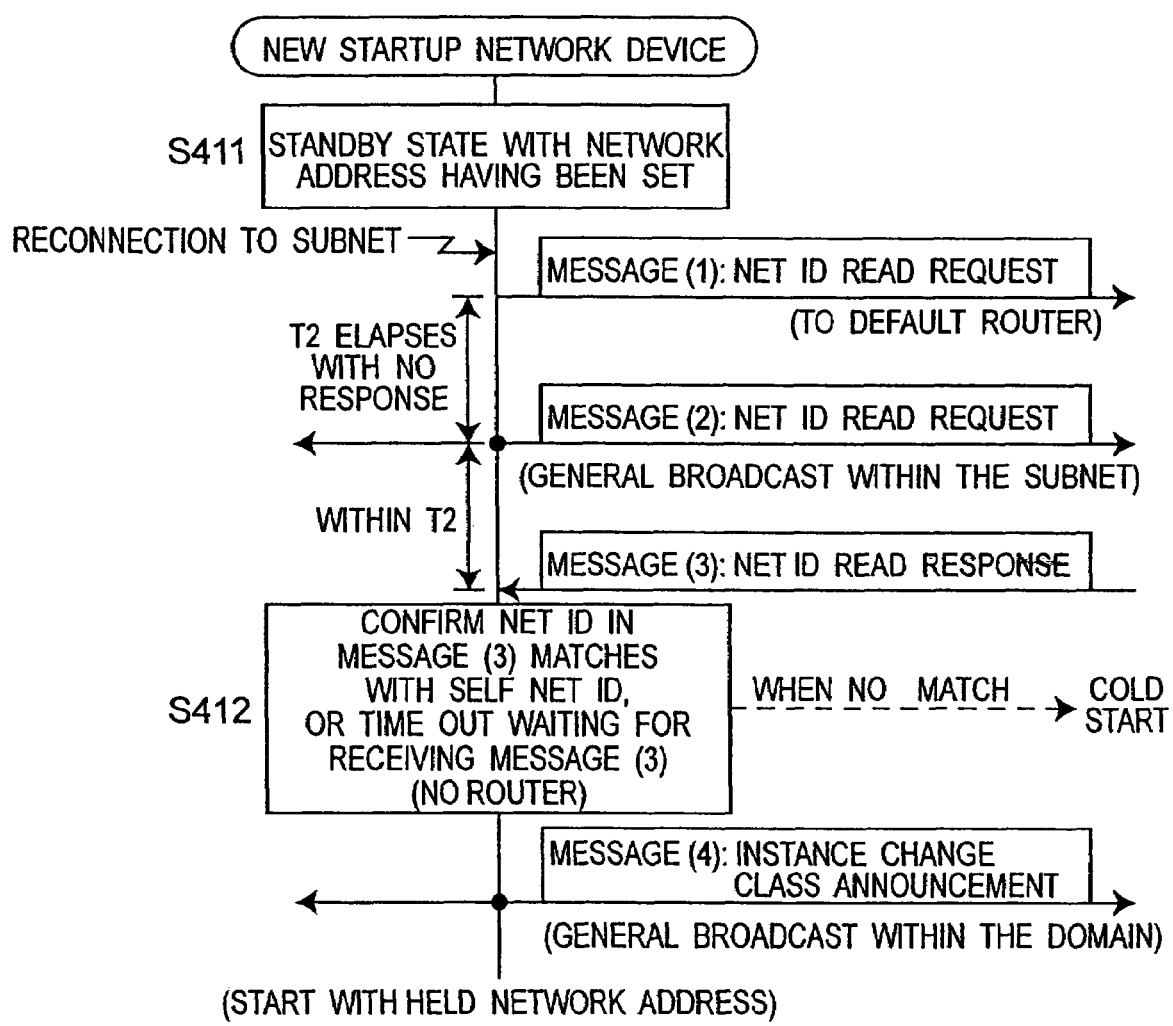
FIG. 19 shows a startup sequence for a warm start of a general network device (when there is no response to Net ID read request).

The basic warm start sequence shown in FIG. 19 is described next. Messages (1) to (4) in FIG. 19 are set as follows.

TABLE 3

| | |
|---|---|
| message (1) | SNA: self network address already stored<br>DNA: address of default router<br>DOJ: router profile object (0x0EF101)<br>OPC: Net ID property (0xE1)<br>OSV: read request (0x62) |
| message (2) | DNA: broadcast within the subnet<br>other values as in message (1) |
| message (3) | Individual response message<br>SNA: router's network address<br>DNA: SNA in message (1)<br>specifies read response to message (1)<br>(SOJ = 0x0EF101, OPC = 0xE1,<br>OSV = 0x72, ODT = Net ID data) |
| message (4) | DNA: broadcast wihtin the domain (0x00FF)<br>SOJ: node profile object (0x0EF001)<br>OPC: instance change class announce property (0xD5)<br>OSV: announcement (0x73) |
| T2 | Time-out waiting Net ID read response<br>If message (3) is not received after waiting T2 (60 seconds: for design guideline), operation starts using previously stored Net ID. |

Referring to FIG. 19, when a network device is reconnected to a subnet from a standby state in which the network address is already set (S411), a message (1) is sent to the default router to request reading the Net ID. A response message from the default router is then awaited and if a response message is not received within the specified time T2, a message (2) is broadcast over the subnet to request reading the Net ID of a router on the subnet. If a message (3) in response to the message (2) is received within the specified time T2, the network device checks whether the Net ID in the response message (3) matches the Net ID stored by the device (S412). If the Net IDs do not match, the cold start sequence runs. If the Net IDs match, or if the message (3) is not received within the specified time T2 after transmitting message (2), a message (4) is broadcast throughout the domain and a status change is announced. In this case, the network device starts up using the stored Net ID.

B. Startup Sequence of General Router at

This embodiment of the invention describes the startup sequence for a general router R1 connected to a network as shown in FIG. 7. This general router R1 is connected to subnet A and subnet B. Parent router Rp is also the master router of subnet A. General router R1 is configured as shown in FIG. 3.

B. 1 Startup Sequence for Cold Start of General Router

The cold start startup sequence for a general router is described first below. This cold start sequence runs when a new router is connected for the first time and when a router that was previously used is replaced with a different router.

For a new connection of the router, if a Net ID is already allocated to each of the two or more subnets managed by the newly connected router, the router function must not be activated in order to avoid a loop within the domain during message communication. For a replacement of the router, however, a Net ID is already assigned to each of all connected subnets.

A general router runs a different startup sequence different from that of other network device (general nodes) on the connected subnet. The conditions enabling a general router to operate normally as a router are different when the router is newly connected to the subnet and when the router is replaced. These different conditions are as described below.

(1) Conditions when a New Router is Connected
  1) There is only one master router on all subnets connected by the (target) router that will perform a cold start.
  2) At least one subnet connected to the target router does not have another router and does not have an assigned Net ID.
  3) Both router data for the new router (router ID and Net ID of the newly connected subnet) and all router data can be obtained from the parent router.

(2) Conditions when a Router is Replaced
  1) There is one master router on all subnets connected by the target router.
  2) A Net ID is assigned to each of all subnets connected by the target router.
  3) Both router data (router ID and Net ID of the newly connected subnet) and all router data can be obtained from the parent router.

TABLE 4

| Case | Detected master routers | Communication with parent router | Net ID assignment state to connected subnets | Process |
|---|---|---|---|---|
| 1 | 2 or more | * | * | Does not start up as a router (router function is inactive) |
| 2 | 0 | * | * | Does not start up as a router |
| 3 | 1 | cannot | * | Does not start up as a router |
| 4 | 1 | can | Assigned to all | Starts up as a replacement router |
| 5 | 1 | can | Not assigned to one | Starts up as a router (router function is active) |

* State not relevant to startup sequence

Various cases which may occur when a general router might do cold start are shown in the following Table 1.

Figure 8:
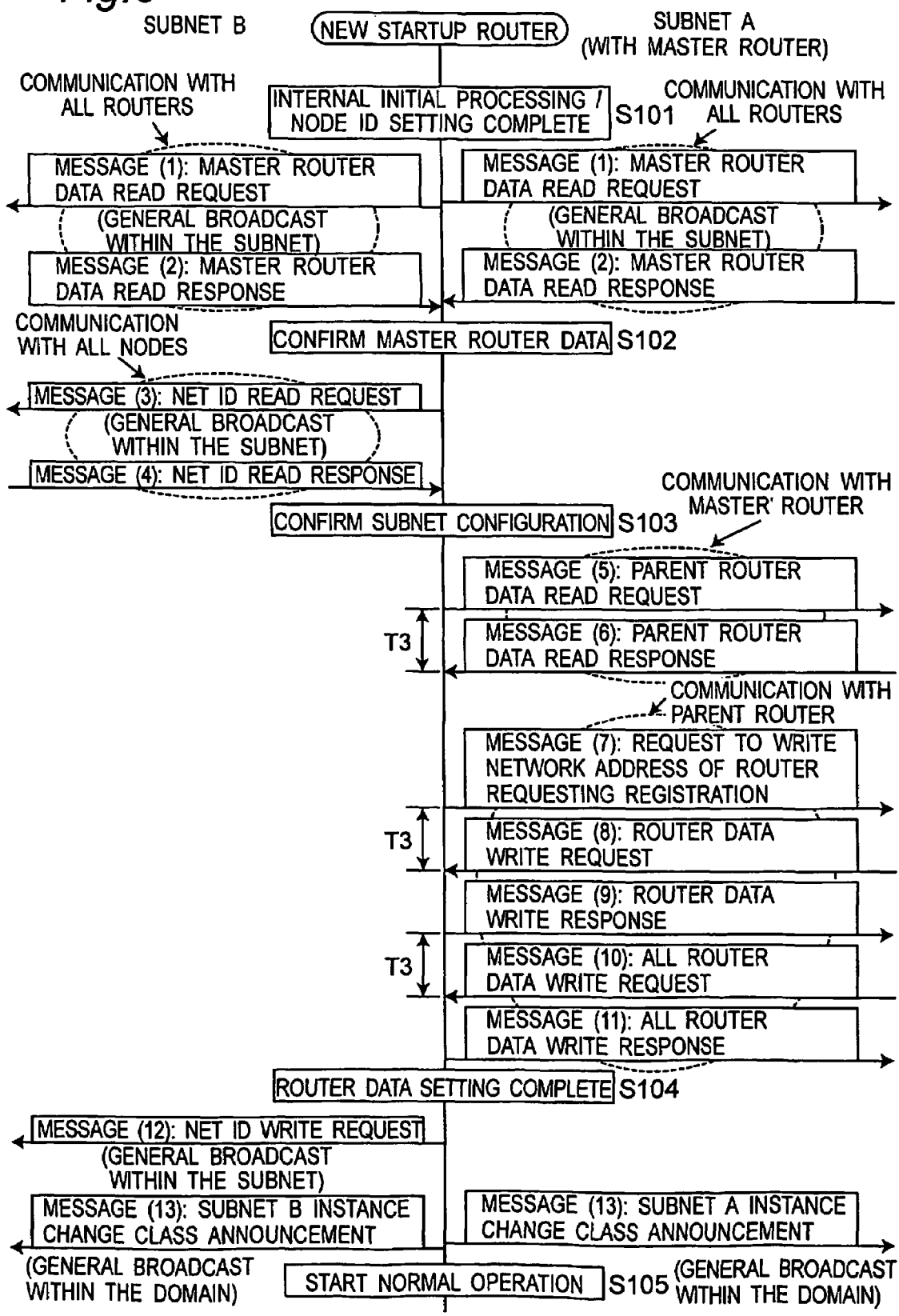
FIG. 8 shows a startup sequence for a cold start of a general router.

FIG. 8 is a view showing the startup sequence of the cold start for a general router. With reference to FIG. 8, the startup sequence of the cold start is described below. Note that messages 1 to 13 in FIG. 8 are defined as shown below.

TABLE 5

| message (1) | SNA: stored value of own network address<br>DNA: broadcast within the subnet<br>DOJ: router profile object (0x0EF101)<br>OPC: master router data property (0xE6)<br>OSV: read request (0x62) |

TABLE 5-continued

| message (3) | SNA: stored value of own network address with the Net ID of 0x00<br>DNA: broadcast within the subnet<br>DOJ: node profile object (0x0EF001)<br>OPC: Net ID property (0xE1)<br>OSV: read request (0x63) |
|---|---|
| message (5) | DNA: master router<br>DOJ: router profile object (0x0EF101)<br>OPC: parent router network address property (0xE3)<br>OSV: read request (0x62) |
| message (7) | SNA: network address on subnet A<br>DNA: parent router<br>DOJ: router profile object (0x0EF101)<br>OPC: registration request router property (0xE5)<br>OSV: write request (0x60) |
| message (8) | DOJ: router profile object (0x0EF101)<br>OPC: self-router data property (0xE0)<br>OSV: write request (0x61) |
| message (10) | DOJ: router profile object (0x0EF101)<br>OPC: all router data property (0xE4)<br>OSV: write request (0x61) |
| message (12) | SNA: network address on subnet B with Net ID of 0x00<br>DNA: broadcast within the subnet (0x01FF)<br>DOJ: node profile object (0x0EF001)<br>OPC: Net ID property (0xE1)<br>OSV: write request (0x60) |
| message (13) | SNA: network address of sabnet A on subnet A side, network address of sabnet B on subnet B side<br>DNA: broadcast within the domain<br>DOJ: node profile object (0x0EF001)<br>OPC: change instance class announce property (0xD5)<br>OSV: report request (0x73) |
| messages (2), (4), (6), (9), (11) | Response to messages (1), (3), (5), (8) and (10), respectively. |

Referring to FIG. 8, the target router (new startup router) R1 first runs an internal initialization process and sets a Node ID (step S101).

When step S101 is completed, the subnet ID code requesting units 314a, 314b broadcast a message (1) within the connected subnets A and B. The message (1) requests master router data from all routers connected to subnets A and B. It is noted that a router has a master router data that indicates whether the router is master or slave on each subnets to which the router connects. The master router data includes master router identifier (0x41 for master router, 0x42 for slave router) at the first byte and Net ID at the second byte. All routers connected to subnets A and B then return messages (2) in response to the message (1) to the target router. The intra-subnet communication processors 319a, 319b of the target router R1 then receive response messages (2), and subnet ID code confirmation unit 316a, 316b confirm the master router data in the received response message (2) (step S102). It can be confirmed that a master router (Rp) is on subnet A by confirming the received messages (2). If it is thus confirmed that there are 0 or 2 or more routers on one subnet, a startup sequence activating the router as a common network device without activating the router functionality is run. If this happens, the rest of the sequence shown in FIG. 8 is not completed.

The subnet ID code requesting unit 314b of the target router R1 then requests, the Net ID to all devices on the subnet B side where there is no master router, with a message (3). In response to the message (3), all devices connected to the subnet B then return messages (4). Based on the Net IDs contained in the received messages (4), the subnet ID code confirmation unit 316b of target router R1 is able to recognize the configuration of the subnet B (step S103). The target router R1 thus confirms the assignment of Net IDs and starts up as a replacement router if a Net ID is assigned to all subnets. However, if there is even one subnet to which a Net ID is not assigned, the target router R1 starts up as a router newly connected to the at least one subnet.

The subnet ID code confirmation unit 316b then sends a message (5) to the master router (Rp) to request a read of the parent router data, In response to message (5), a message (6) is returned. It should be noted that T3 in FIG. 8 denotes the response time-out time. The parent router Rp is thus confirmed from the message (6), and the subnet ID code reporting unit 315a of the target router R1 then sends message (7) to the parent router Rp. This requests the parent router Rp to write (register) an address of the target router R1 into the parent router Rp. A router data write request is then sent in a message (8) from the parent router Rp to the target router R1, and all router data write request is sent in a message (10). The target router R1 then returns response messages (9) and (11) to the messages (8) and (10). It is noted that the message (7) does not need a response message.

When setting the router information is thus completed (step S104), subnet ID code reporting unit 315b broadcasts a message (12) within the subnet B to request to write the Net ID to each node in the subnet B. A message (13) is also sent to announce a status change to subnets A and B.

When this startup sequence ends, the target router R1 starts operation as a router (step S105).

The Net IDs, parent router data, and all router data obtained through the above sequence are respectively stored to the subnet ID code storage unit 313, the parent router data storage unit 312, and the all router data storage unit 311.

B.2 Startup Sequence for Warm Start of General Router

The warm start sequence of a general router is described next.

The warm start sequence of the general router runs when the power is restored and routers reboot after the power to the entire domain is interrupted due to a power outage, for example. When a general router warm starts depends on various factors including whether a master router is detected on a subnet, but the major cases are shown in the following table. The specific operations performed in each of these cases are shown in the following four sequences A to E.

It is noted that the routing function of the router is paused during a warm start until the process ends (i.e., normal operation resumes).

Process A: to startup using data stored from before the warm start.

Process B, C: to request the parent router to provide router data and then to startup using the data from the parent router.

Process D: not to start routing function in the router.

Process E: to start up as a simple node with the routing function not enabled.

Figure 9:
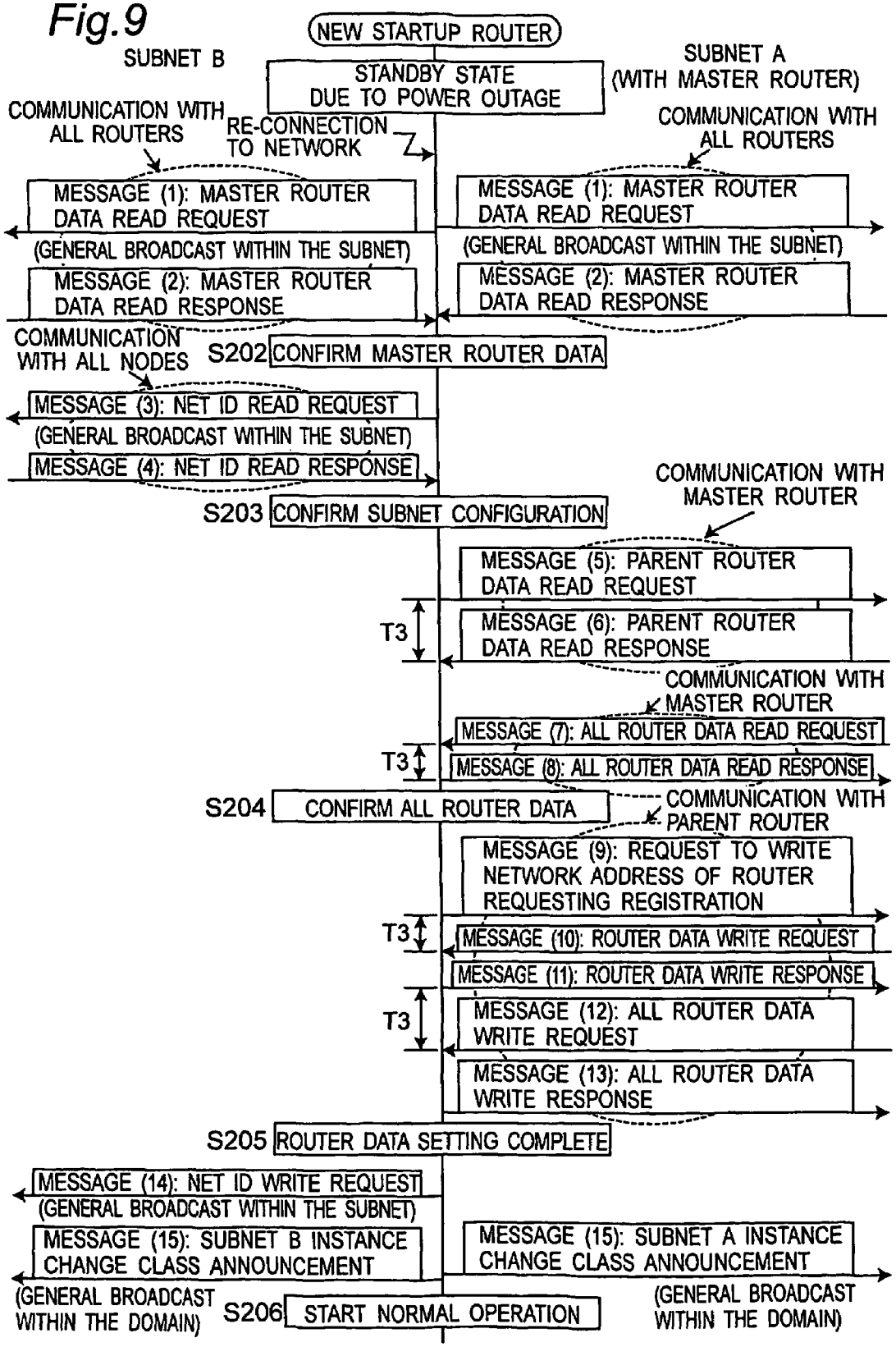
FIG. 9 shows a startup sequence for a warm start of a general router.

The warm start sequence of a general router is described more fully with reference to FIG. 9. Messages (1) to (15) shown in FIG. 9 are set as shown in Table 4.

TABLE 7

| | |
|---|---|
| message (1) | SNA: stored value of network address of each subnet |
| | DNA: broadcast within the subnet |
| | DOJ: router profile object (0x0EF101) |
| | OPC: master router data property (0xE6) |
| | OSV: read request (0x62) |
| message (3) | SNA: stored value of network address with the Net ID value of 0x00 |
| | DNA: broadcast within the subnet |
| | DOJ: node profile object (0x0EF001) |
| | OPC: Net ID property (0xE1) |
| | OSV: read request (0x62) |
| message (5) | DNA: master router |
| | DOJ: router profile object (0x0EF101) |
| | OPC: parent router network address property (0xE3) |
| | OSV: read request (0x62) |
| message (7) | DNA: master router |
| | DOJ: router profile object (0x0EF101) |
| | OPC: all router data property (0xE4) |
| | OSV: read request (0x62) |
| message (9) | SNA: network address on subnet A |
| | DOJ: router profile object (0x0EF101) |
| | OPC: registration request router property (0xE5) |
| | OSV: write request (0x60) |
| message (10) | DOJ: router profile object (0x0EF101) |
| | OPC: self-router data property (0xE0) |
| | OSV: write request (0x61) |
| message (12) | DOJ: router profile object (0x0EF101) |
| | OPC: all router data property (0xE4) |
| | OSV: write request (0x61) |
| message (14) | SNA: network address on subnet B |
| | DNA: broadcast within the subnet (0x01FF) |
| | DOJ: node profile object (0x0EF001) |
| | OPC: Net ID property (0xE1) |
| | OSV: write request (0x60) |
| message (15) | SNA: network address on subnet B with Net ID of 0x00 |
| | DNA: broadcast wihtin the domain |
| | DOJ: node profile object (0x0EF001) |
| | OPC: change instance class announce property (0xD5) |
| | OSV: report request (0x73) |

TABLE 6

| Case | Detected master routers | Communication with parent router | Master router data | All router data from master router | Connected subnet information | Process |
|---|---|---|---|---|---|---|
| 1 | 2 or more | * | * | * | * | D |
| 2 | 0 | * | * | * | same | A |
| 3 | 0 | * | * | * | different (all nodes) | E |
| 4 | 1 | impossible | same | same | same | A |
| 5 | 1 | impossible | same | same | different (all nodes) | E |
| 6 | 1 | impossible | same | different | * | E |
| 7 | 1 | impossible | different | * | * | E |
| 8 | 1 | possible | same | * | same | B |
| 9 | 1 | possible | same | * | different (all nodes) | C |
| 10 | 1 | possible | different | * | * | C |

* State not relevant to startup sequence

TABLE 7-continued

| messages (2), (4), (6), (8), (11), (13) | Responses to messages (1), (3), (5), (7), (10), (12), respectively. |
|---|---|

Referring to FIG. 7 and FIG. 9, when the off-line state resulting from a power outage, for example, ends and the target router R1 reconnects to the subnet, subnet ID code requesting units 314a, 314b of the target router R1 broadcast message (1) to the subnets A and B to which the router is connected. All routers on subnets A and B are thus requested to return the master router data. A message (2) in response to the request message (1) is returned to the target router. The subnet ID code confirmation unit 316a, 316b of the target router R1 then confirm the master router data in the received response message (2) (step S202). If it is thus confirmed that there are 2 or more master routers on one subnet, the routing function of the router is not enabled (that is, the rest of the sequence shown in FIG. 9 does not run).

The subnet ID code requesting unit 314b of the target router then sends a Net ID read request with a message (3) to all nodes on the subnet where a master router (Rp) is not found, that is, subnet B in this example. A response message (4) to the message (3) is then returned from all devices on subnet B. Based on the Net IDs contained in the received response messages (4), the subnet ID code confirmation unit 316b of the target router R1 is able to confirm (comprehend) the configuration of the subnet (step S203). If the number of master routers is 0 and the stored subnet configuration and the confirmed subnet configuration differ, the routing function of the router is not enabled (i.e., the rest of the sequence does not run). If the number of master routers is 0 and the stored subnet configuration and the confirmed subnet configuration are the same, the router operates using the stored information (i.e., the rest of the sequence does not run).

The subnet ID code requesting unit 314a then asks the master router Rp to send the parent router data by sending a message (5). A message (6) is then returned in response to the message (5).

The subnet ID code requesting unit 314a then sends a read request in message (7) to the master router Rp. A message (8) is returned in response to the message (7). Based on the response message (8), the subnet ID code requesting unit 314a confirms the all router data (step S204). If there is no parent router, the all router data is retrieved from the master router. If the retrieved data, the data stored in the target router and the subnet configuration detected in step S203 match, the router operates using the stored router data (the rest of the process does not run). If the configurations do not match, the routing function is not enabled (the rest of the sequence does not run).

A target router R1 address write (registration) request is then sent to the parent router Rp in a message (9). The parent router Rp then sends a message (10) for a router data write request and a message (12) for all router data write request. Response messages (11) and (13) are returned in response to messages (10) and (12), respectively.

When setting the router data is thus completed (step S205), the subnet ID code requesting unit 314b broadcasts a message (14) over subnet B to request to write the Net ID to each device in subnet B. Message (15) is also sent to both subnets A and B to announce a status change. When this startup sequence ends, the target router R1 starts normal operation as a router (step S206).

The Net IDs, parent router data, and all router data obtained through the above sequence are respectively stored to the subnet ID code storage unit 313, the parent router data storage unit 312, and the all router data storage unit 311, respectively.

Fifth Embodiment

In description of the third embodiment, the network device receives and does not destroy a message when the hop count of the received message is 0 and the source Net ID is 0x00 if the destination is itself. Alternatively the router receives and responds to a message that is a request related to the router data even if the Net ID of the source does not match that of the router it self. In that embodiment, the Net ID of the slave router part is 0x00, but it is temporary Net ID until a correct ID is assigned by the parent router and then is set to a value other than 0x00 after it starts up as a router. The following problems can thus occur.

Referring to the network shown in FIG. 2, when the device 23a is newly connected to the subnet C 23 or when the device 23a is a portable device with a wireless networking capability that moves into range of subnet C, the device 23a normally obtains a Node ID that is unique within subnet C and then obtains the Net ID of subnet C. If for some reason the Net ID is unobtainable, then a temporary Net ID such as 0x00 is used. The device 21b on the subnet A (21) may likewise be temporarily using 0x00 as a Net ID. There could thus be multiple device nodes with a temporary Net ID of 0x00 in the network domain at the same time.

If device 23a, for example, then transmits or broadcasts a message with the destination network address DNA set to the Net ID of subnet A or B other than the subnet (C), when the router 32 routes the message to the subnet other than subnet C, the device 21b on the subnet A or the router 31 will receive a message that it should not normally process and may run an unnecessary process.

Especially, if the received message requires a response, when the router 31 sends a response message, the device 21b on the subnet A that should not receive the response will receive since the destination network address DNA in the response is set to 0x00 as described above. This causes the device 21b to do unnecessary processing.

The router 31 or device 21a on the subnet A that received a certain message from the source node device 23a may also determine that the message was from the device 21b on the same subnet A. In this case there is a strong possibility of a system error occurring. This can occur particularly when the router or device does not have a function for monitoring the hop count and determining the appropriate process based on the hop count, or if this function is disabled.

The following three methods can be used to avoid the above problems.

(1) In the first way, when receiving a message (including broadcasts and broadcasts within the domain) with DNA set to a different subnet and the Net ID of SNA set to 0x00, the router does not route the message outside of the same subnet;

(2) In the second way, the receiving node, receiving device, or receiving router monitors the hop count of a message with the SNA set to 0x00, and destroys the message of which hop count is not 0, i.e., a message that came from a different subnet; and (3) In the third way, any device having a Net ID of 0x00 does not issue a message to be transmitted to a different subnet.

Methods (1) and (3) are effective when a device without a hop count monitoring function is connected to the subnet.

Method (1) above can be achieved by implementing the following procedures. It is determined if SNA of the received message is 0x00, and if DNA is a Net ID other than the Net ID of the router. Further it is determined if the SNA of the received message is 0x00, and if the broadcast identifier denotes a broadcast within the domain. If either determination result is "YES", since it means that the received message meets the above conditions, the routing of the received message is not done according to the result of the determination. It is noted that to stop routing the message is the same as the router destroying the message.

Method (2) can be achieved by implementing the following procedures. First it is determined if the SNA of the received message is 0x00, if the broadcast identifier denotes a broadcast within the domain, and if the hop count is 1 or higher. If either determination result is "YES", it means that the received message meets the above conditions. Therefore, the message is destroyed.

Method (3) can be achieved by implementing the following procedures. When the Net ID of the device is 0x00, the device issues a message to request the Net ID to reset, as already described, receives the Net ID from routers or other devices on the same subnet, and for a predetermined time does not issue a message in which DNA is set to a different Net ID as well as not broadcast a message. (If a message is broadcast, it must be handled using methods (1) and (2).)

Sixth Embodiment

The preceding embodiments use as a property of messages relating to the router an object property code OPC indicating the content type of the message (see FIG. 6B). An exemplary method for determining this object property code OPC is described below. Each property is described below, including property name, property code, property content and method of denoting a value, a data type, a data size, an access rule, information whether a property is essential, an announcement when a property changes, and so on. It should be noted that values of codes are shown below bay way of example.

[Operating Status Property]

When OPC=0x80, the operating status property indicates "a operating status of Net ID server function" or "a operating status of router function". 0x30 indicates active, 0x31 indicates inactive. The data type is UC (unsigned Character), the size is 1 byte, the access rule is Set/Get. Here, "Set" denotes to write the property value, while "Get" denotes to read the property value. This property must be announced or reported when the status changes.

This profile class exists when a node has a Net ID server function or router function. This property indicates whether the Net ID server function or router function is active (i.e., whether the node is functioning as a router).

[Abnormal Content Property]

This property indicates "abnormal content" when OPC is 0x89. It takes a value of 0x0000 to 0x000F (0 to 15), the data type is US, the size is 2 bytes, the access rule is "Get.". This property is not essential, and an announcement at the state change is not essential. The value of this property has a meaning as follows.

0x0000 means "not abnormal". 0x0001 means "no parent router" (that is, no Net ID is assigned to any connected subnet, and there is no parent router). 0x0002 means "retrieving data from the parent router failed" (that is, a Net ID server function was detected in the domain, but router data and all router data could not be retrieved from the Net ID server function). 0x0003 means "subnet communication error" (communication is impossible on one of the two or more subnets connected to the self. 0x0004 to 0x000F mean "available to users". 0x0010 to 0xFFFF mean "reserved for future use".

[Self-Router Data Property]

When OPC is 0xE0, the property denotes "a self router data". The first byte indicates "router attribute", the second byte indicates "self route ID" (default=0x00), the third byte indicates "number of connected subnets", the fourth byte and the later indicate EA data (network addresses of the subnet (ex. Echonet), each two bytes, for the number of connected subnets). The data type is UC, the size is maximum 17 bytes, the access rule is Set/Get. In this property, the first byte indicates "router attribute", the attribute indicated by this code are determined by the presence of a Net ID server function, router function, and automatic router data setting function.

The router can also automatically acquire the data required to function as a router by means of the startup sequence described above, but in office buildings and other non-residential installations the startup sequence described above may not be followed when unique subnetwork addresses are assured throughout the domain. The presence of an automatic router information setting function indicates the presence of a function enabling the above startup sequence, and the absence of this function indicates a router that does not follow the above startup sequence.

The bit sequence in the first byte means as follows. A bit b0 indicates a presence of a Net ID server function (1=yes; 0=no), A bit b1 indicates a presence of a router function (1=yes; 0=no), A bit b2 indicates a presence of an automatic router information setting function (1=yes; 0=no), Bits b3, b4, b5, b6 and b7 are 00010. The bit b0=b1=1 never occurs. When the bit b0 is 0 and the bit b1 is 1, it denotes a general router, while when the bit b0 is 1, it denotes a parent router.

The self router ID indicated in the second byte is a unique value for each router in the domain, and is uniquely determined by the parent router on automatically setting.

The number of connected networks indicated in the third byte is a maximum of 7. Regarding a router connected with eight or more subnets, it is possible to handle it by changing router attributes in a future. The fourth byte and the later store network address data for the number of connected subnets.

[Net ID Property]

When OPC is 0xE1, this property indicates one byte of Net ID. The default is 0x00. The data type is UC, the size is 1 byte, and the access rule is Set/Get. This property is essential. An announcement when the status changes is not essential.

This property stores the Net ID acquired from the master router or parent router in the router startup sequence. Since the router connects plural subnets, there is a unique router profile object for each subnet. The knowable value of this property is different for each subnet.

[Router ID Property]

When OPC is 0xE2, this property indicates one byte of router ID. The default is 0x00. The data type is UC, the size is one byte, and the access rule is Set/Get. The router ID is assigned by the parent router as an identifier uniquely identifying the router. All router IDs are managed by the parent router.

[Parent Router Data Property]

When OPC is 0xE3, this property indicates the network address of the parent router (referred to as EA below). The default is 0x0000 (no parent router data). The data type is UC, the size is 2 bytes, and the access rule is Set/Get. This property is essential. An announcement when the status changes is not essential.

[All Router Data Property]

When OPC is 0xE4, this property indicates all router data in the domain. The data type is UC, the size is maximum 246 bytes, and the access rule is Set/Get. This property is essential. An announcement when the status changes is not essential.

[Router Registration Request Data Property]

When OPC is 0xE5, this property indicates router registration request data. The first byte indicates "router attribute". The second byte indicates "self router ID (default=0x00)". The third byte indicates the number of connected subnets. The fourth byte and the later contain EA data (network address of the subnet (ex. Echonet), each two bytes, for the number of connected subnets). The data type is UC. The size is maximum 17 bytes. The access rule is only Set. This property is essential. An announcement when the status changes is not essential.

This property is essential to any node having a Net ID server function. By writing the network address of every node in the general router (all EA data) to this property in the router startup sequence, a general router announces its own network address (EA) data to the node with the Net ID server function. During the router startup sequence, a node with a Net ID server function executes a write request to the self-router data property and all router data property of the router profile for a general router, based on the content requested in this property by a general router.

[Master Router Data Property]

When OPC is 0xE6, this property indicates master router data. The first byte indicates master router identifier (master router is 0x41, slave router is 0x42). The second byte indicates Net ID data. The data type is UC. The size is 2 bytes. The access rule is Get. This property is used in the startup sequence of a general router. Because the router is connected to plural subnets, there is a unique router profile object for each subnet. The knowable value of this property is different for each subnet. If announcement at the status change is essential, it is always processed when the property is implemented. If there are multiple nodes within a single router, the above profile class is defined for each node, but common values specific to the router are stored for all properties other than Net ID of 0xE1.

The properties in the above-described router profile class are provided with class group code of 0x0E, class code of 0xF1, and instance code of 0x01.

The router profile class process specifications are described in detail next.

It should be noted that OPC and ODT used above are denoted as EPC and EDT, respectively, below.

Regarding router profile class, a communication device having multiple nodes but not a router function do not have a router profile class. A general node requires this stipulation.

If a node has an Net ID server function or a router function, this class must be implemented. This stipulation is also essential in general routers and parent routers.

If a single device has multiple nodes, this property is provided in the router profile class for each node in the device functioning as a router, common values are stored for properties other than Net ID (EPC=0xE1) and master router data (EPC=0xE6). This stipulation is also essential in general routers and parent routers.

Essential properties defined in the router profile class shall be provided. This stipulation is also required in general routers and parent routers.

The access rule shall be set to Get (property that can be referenced from other nodes, i.e., ESV=0x62 or 0x63) for each of the following properties: operating status (EPC=0x80), self router data (EPC=0xE0), Net ID (EPC=0xE1), router ID (EPC=0xE2), parent router data (EPC=0xE3), all router data (EPC=0xE4), master router data (EPC=0xE6). This stipulation is also required in general routers and parent routers.

[Operating Status Property]

The operating status property (EPC=0x80) means an announcement for a status change by broadcasting a notice to the domain when a state changes. This stipulation is required in general routers and parent routers. This property indicates if the Net ID server function or router function is active, in which 0x30 means active, and 0x31 means inactive. This stipulation is essential in general routers and parent routers.

[Abnormal Content Property]

In this property, a value in the range 0x0004 to 0x000F and the range 0x0010 to 0xFFFF is not set as a property value (EDT) of abnormal content (EPC=0x89). This stipulation is essential in routers and parent routers. In this property, 0x0000 is set when the content is not abnormal, 0x0001 is set when a parent router could not be detected, 0x0002 is set when retrieving data from the parent router failed, and 0x0003 is set when communication can not be established on one of the subnets connected to the router.

[Self Router Data Property]

In this property, the first byte indicates a router attribute, the second byte indicates the self router ID, the third byte indicates the number of connected subnets, the fourth byte and the later contain all EA stored in itself (EAs for the number of connected subnets).

If a Net ID server function is provided, a bit b0 of the first byte is set to 1, whenever the Net ID server function is operating. If a Net ID server function is not provided, a bit b0 of the first byte is set to 0.

In this property, when the Net ID server and the router which have a router function, a bit b1 of the first byte is set to 1.

If there is no startup sequence function, a bit b2 of the first byte in this property is set to 0. If there is a startup sequence function, the bit b2 of the first byte is set to 1.

This property stipulates that a general router shall not function as a router unless a value other than 0x00 is set by the parent router to the self router ID in the second byte.

The number of connected subnets in the third byte shall be a value of 7 or less in this property.

[Net ID Property]

For this property, a value other than 0x00 is set in the Net ID server when the Net ID server function starts.

For this property, the value acquired from a Net ID server or the master router is set in a general router.

The value knowable to each subnet by this property is different (a value specific to the subnet is returned in response to a read request).

For this property, the slave side of a general router will not accept a Set from a router other than the master router.

This property requires that if a request to write to this property a value different from the Net ID already stored is received during normal operation from the master router, the device stops and then either warm starts or cold starts.

This property requires that requests to write to this property during normal operation a value different from the Net ID already stored will not be received.

With this property, while the router function or Net ID server function is inactive, a Set or a Get will not be accepted (i.e., is not visible from the outside) and this property is removed from a property map.

[Router ID Property]

In this property, a general router sets the value of the second byte in the self router data written by the parent router during the startup sequence, and does not accept external write requests.

A Net ID server (parent router), when starting up as a Net ID server, sets this property by itself. External write requests to this property is not accepted.

[Router Registration Request Data Property]

This property is used only in the Net ID server. (It is not used with general routers, and is not available if a router starts up as a general router even if it has a Net ID server function.)

When there is a write request to this property, the Net ID server runs the startup process for the router from which the registration request was received (if it can start up as a router; a write request to the self router data property and all router data property in the router profile for the general router is executed).

[Parent Router Data Property]

The slave side of a general router sets this property by acquiring the value from the master router. With this property write requests from others will not be accepted.

For this property, the general router (slave side) and Net ID server holds the default value 0x0000 until the general router (slave side) and Net ID server both start up as a general router and Net ID server, respectively. The parent router (Net ID server) sets the value of its own network address (EA) to this property. With this property, write requests from others will not be accepted.

[All Router Data Property]

This property is set in a general router (slave side) by a write request from a master router or a parent router. Write requests from other than the master router or the parent router are not accepted.

When the Net ID server detects a domain configuration change (a new general router is added or reset, for example), it writes the new information relating to the all router data property of all general routers in the domain.

[Master Router Data Property]

This property indicates if a router enabling a router function on a subnet which opens a router profile class is a master router. This property is set to 0x41 when the router is a master router, and is set to 0x42 when it is a slave router.

With this property, master router data can be set internally by the router based on the self router data set by the parent router (in the case of the parent router, set internally by itself), and is read-only to other devices. As will be app system, and thereby enables the system or the router to restart in a short time.

Furthermore, when the entire network system is reset or only a specific router is reset or replaced, the state in use before the router was replaced can be automatically restored, and system management is facilitated without needing to reset the information known to the controller or other device used to manage the networked devices.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

The present disclosure relates to subject matter contained in Japanese Patent Applications No. 2002-006497 filed on Jan. 15, 2002, No. 2002-028342 filed on Feb. 5, 2002, No. 2002-044765 filed on Feb. 21, 2002, and No. 2002-270846 filed on Sep. 18, 2002, which are expressly incorporated herein by reference in its entirety.

The invention claimed is:

1. A method of starting a first routing device connecting a plurality of networks to which a plurality of routing devices are connected,
   wherein each routing device stores master router data for each network to which the routing device is connected and network identification data,
   wherein the master router data stored by each routing device indicates whether the respective routing device is a master router or a slave router with respect to each network to which the respective routing device is connected,
   wherein, with respect to each network, one of the routing devices connected thereto that is also connected to a network nearer to a parent router, which assigns the network identification data to identify the networks, is the master router,
   wherein, with respect to each network, one or more of the routing devices connected thereto that is not connected to the network nearer to the parent router, is the slave router, and
   wherein the network identification data of each respective routing device identifies a network to which the respective routing device is connected,
   the method of starting the first routing device comprising:
      requesting, by the first routing device, the master router data from each routing device connected to the networks to which the first routing device is connected;
      acquiring the master router data in response to the requesting of the master router data;
      determining, from the acquired master router data, a number of detected master routers connected to the networks to which the first routing device is connected; and
      disabling a router function of the first routing device when, in relation to the networks to which the first routing device is connected, the determined number of detected master routers is zero or two or more, such that a loop path is prevented from forming between the first routing device and the plurality of routing devices,
      wherein the routing function of the first routing device allows the first routing device to connect to a network, such that when the router function is disabled, the first routing device cannot connect to the network.

2. The method according to claim 1, wherein, when receiving data relating to a request for an attribute of a routing device, a routing device returns a response, even if a hop count is zero and the network identification data of the source of the received data is different from the network identification stored in the routing device which received the request for the attribute.

3. The method according to claim 1, wherein, when a communication device connected to the networks stores network identification data to identify a network to which the communication device connects, the method further comprises transmitting requests for reading out network identification data to communication devices connected to any of the networks to which the first routing device is connected, and disabling the router function of the first routing device when a configuration of the networks to which the first routing device is connected is different from a configuration of networks stored by the first routing device.

4. The method according to claim 1, further comprising transmitting a request for reading out information relating to the parent router to a routing device which stores master router data indicating a master router.

5. The method according to claim 1, wherein only the master router requests writing of the network identification data to communication devices other than the routing devices, the master router accepts a request for writing the network identification data only from the parent router, and the parent router does not accept the request for writing the network identification data.

6. A first routing device connecting a plurality of networks to which a plurality of routing devices are connected,
wherein each routing device stores master router data for each network to which the routing device is connected and network identification data,
wherein the master router data stored by each routing device indicates whether the respective routing device is a master router or a slave router with respect to each network to which the respective routing device is connected,
wherein with respect to each network one of the routing devices connected thereto that is also connected to a network to a parent router, which assigns the network identification data to identify the networks, is the master router,
wherein, with respect to each network, one or more of the routing devices connected thereto that is not connected to the network nearer to the parent router, is the slave router, and
wherein the network identification data of each respective routing device identifies a network to which the respective routing device is connected,
the first routing device comprising:
a requesting section for requesting the master router data from each routing device connected to the networks to which the first routing device is connected;
a receiving section for receiving the master router data in response to the requesting of the master router data by the requesting section;
a determining section for determining, from the received master router data, a number of detected master routers connected to the networks to which the first routing device is connected; and
a disabling section for disabling a router function of the first routing device when, in relation to the networks to which the first routing device is connected, the determined number of detected master routers is zero or two or more, such that a loop path is prevented from forming between the first routing device and the plurality of routing devices,
wherein the routing function of the first routing device allows the first routing device to connect to a network, such that when the router function is disabled, the first routing device cannot connect to the network.

7. The method according to claim 2, further comprising transmitting a request for reading out information relating to the parent router to a routing device which stores master router data indicating a master router.

8. The method according to claim 3, further comprising transmitting a request for reading out information relating to the parent router to a routing device which stores master router data indicating a master router.

9. The method according to claim 2, wherein only the master router requests writing of the network identification data to communication devices other than the routing devices, the master router accepts a request for writing the network identification data only from the parent router, and the parent router does not accept the request for writing the network identification data.

10. The method according to claim 3, wherein only the master router requests writing of the network identification data to communication devices other than the routing devices, the master router accepts a request for writing the network identification data only from the parent router, and the parent router does not accept the request for writing the network identification data.

11. The method according to claim 4, wherein only the master router requests writing of the network identification data to communication devices other than the routing devices, the master router accepts a request for writing the network identification data only from the parent router, and the parent router does not accept the request for writing the network identification data.

12. A computer-readable recording medium having a program recorded thereon, the program causing a computer to execute the method of claim 1.

13. A computer-readable recording medium having a program recorded thereon, the program causing a computer to execute the method of claim 2.

14. A computer-readable recording medium having a program recorded thereon, the program causing a computer to execute the method of claim 3.

15. A computer-readable recording medium having a program recorded thereon, the program causing a computer to execute the method of claim 4.

16. A computer-readable recording medium having a program recorded thereon, the program causing a computer to execute the method of claim 5.

17. The method according to claim 1,
wherein the method is performed when the first routing device is newly connected to the network and when the first routing device replaces a previous router.

* * * * *